United States Patent
Orsini et al.

(10) Patent No.: US 11,525,656 B2
(45) Date of Patent: Dec. 13, 2022

(54) SELF-RETRACTING TAPE RULE

(71) Applicant: STANLEY BLACK & DECKER, INC., New Britain, CT (US)

(72) Inventors: Antony J. Orsini, Cheshire, CT (US); William Michels, Milford, CT (US); Daniel White, Baltimore, MD (US); Keith Lombardi, Avon, CT (US)

(73) Assignee: STANLEY BLACK & DECKER, INC., New Britain, CT (US)

( * ) Notice: Subject to any disclaimer, the term of this patent is extended or adjusted under 35 U.S.C. 154(b) by 42 days.

(21) Appl. No.: 17/119,674

(22) Filed: Dec. 11, 2020

(65) Prior Publication Data

US 2021/0095946 A1   Apr. 1, 2021

Related U.S. Application Data

(63) Continuation-in-part of application No. 16/246,919, filed on Jan. 14, 2019, now Pat. No. 11,118,887.

(51) Int. Cl.
*G01B 3/1003* (2020.01)
*G01B 3/1007* (2020.01)
(Continued)

(52) U.S. Cl.
CPC ......... *G01B 3/1003* (2020.01); *G01B 3/1007* (2020.01); *G01B 3/1048* (2020.01);
(Continued)

(58) Field of Classification Search
CPC .. G01B 3/1003; G01B 3/1007; G01B 3/1048; G01B 2003/1012; G01B 2003/103; G01B 2003/1038
See application file for complete search history.

(56) References Cited

U.S. PATENT DOCUMENTS 1,828,401 A * 10/1931 Farrand ................ G01B 3/1003
                                                           205/135
2,171,504 A    8/1939 Keuffel et al.
(Continued)

FOREIGN PATENT DOCUMENTS

DE         261829      11/1988
DE         262275      11/1988
(Continued)

OTHER PUBLICATIONS

Extended European Search Report dated Mar. 6, 2020.
(Continued)

*Primary Examiner* — Yaritza Guadalupe-McCall
(74) *Attorney, Agent, or Firm* — Pillsbury Winthrop Shaw Pittman LLP

(57) ABSTRACT

A tape rule comprises a blade, a reel, a spring, a lock, and a housing. The blade comprises a substrate and a coating. The coating is configured to provide color, environmental protection, and/or abrasion resistance. In some embodiments, (1) the coating is formed from non-polymer materials; (2) the blade comprises reinforcements metallurgically bonded to the blade at or near a free end; (3) measurement indicia comprise laser marked portions of the substrate that create color contrasts with other portions of the substrate; (4) the measurement indicia comprise portions of the substrate visible through gaps in the coating; (5) the measurement indicia comprise voids in the substrate filled with a coating material having a contrasting color; and/or (6) the substrate has a surface texture configured to change an appearance of the coating relative to an appearance of the coating on an as-rolled surface finish of the metal substrate.

20 Claims, 11 Drawing Sheets

(51) Int. Cl.
*G01B 3/1005* (2020.01)
*G01B 3/1048* (2020.01)

(52) U.S. Cl.
CPC ............... *G01B 2003/103* (2013.01); *G01B 2003/1012* (2013.01); *G01B 2003/1038* (2013.01)

(56) References Cited

U.S. PATENT DOCUMENTS

| | | | |
|---|---|---|---|
| 2,314,915 A | 3/1943 | Witchger | |
| 2,354,756 A * | 8/1944 | Henzel | G01B 3/1003 205/135 |
| RE23,133 E | 7/1949 | Keuffel et al. | |
| 2,658,006 A | 11/1953 | Beeber | |
| 2,809,142 A | 10/1957 | Beeber et al. | |
| 3,491,742 A | 1/1970 | Weiss | |
| 6,449,866 B1 | 9/2002 | Murray | |
| 6,804,899 B2 | 10/2004 | Murray | |
| 7,398,604 B2 | 7/2008 | Murray | |
| 7,487,600 B1 | 2/2009 | Cooper | |
| 7,565,751 B2 | 7/2009 | Murray | |
| 8,584,373 B2 | 11/2013 | Murray et al. | |
| 8,793,890 B2 | 8/2014 | Delneo et al. | |
| 8,904,661 B1 * | 12/2014 | Norgard | G01B 3/004 33/494 |
| 9,032,634 B1 * | 5/2015 | Norgard | G01B 3/004 33/494 |
| 9,222,362 B2 | 12/2015 | Ford et al. | |
| 10,731,960 B2 * | 8/2020 | Shen | G01B 3/1061 |
| 11,118,887 B2 * | 9/2021 | Orsini | G01B 3/1056 |
| 2002/0129509 A1 | 9/2002 | Evans, III | |
| 2004/0088870 A1 * | 5/2004 | Schafer | B26B 29/06 33/1 B |
| 2005/0138829 A1 | 6/2005 | Critelli et al. | |
| 2006/0130352 A1 | 6/2006 | Huang | |
| 2008/0086902 A1 | 4/2008 | Murray | |
| 2008/0086904 A1 | 4/2008 | Murray | |
| 2009/0162207 A1 | 6/2009 | Peters et al. | |
| 2014/0290085 A1 | 10/2014 | Delneo et al. | |
| 2015/0247716 A1 | 9/2015 | Craig et al. | |
| 2017/0292821 A1 | 10/2017 | Deleo et al. | |
| 2017/0322006 A1 | 11/2017 | Stewart et al. | |
| 2018/0195847 A1 | 7/2018 | Khangar et al. | |
| 2020/0225017 A1 * | 7/2020 | Orsini | G01B 3/1056 |
| 2020/0263969 A1 | 8/2020 | Zirbes et al. | |

FOREIGN PATENT DOCUMENTS

| | | |
|---|---|---|
| DE | 10008996 | 8/2001 |
| FR | 2147551 | 3/1973 |
| GB | 1268369 | 3/1972 |
| JP | S495063 | 1/1974 |
| JP | 11-55514 | 6/1989 |
| JP | 2002048501 | 2/2002 |
| WO | 2011035122 | 3/2011 |

OTHER PUBLICATIONS

Non-Final Office Action issued in corresponding U.S. Appl. No. 16/246,919, dated Dec. 22, 2020.
Notice of Allowance issued in corresponding U.S. Appl. No. 16/246,919, dated May 17, 2021.
Examination Report issued in corresponding European Patent Application No. 20150502.1, dated Nov. 17, 2021.

* cited by examiner

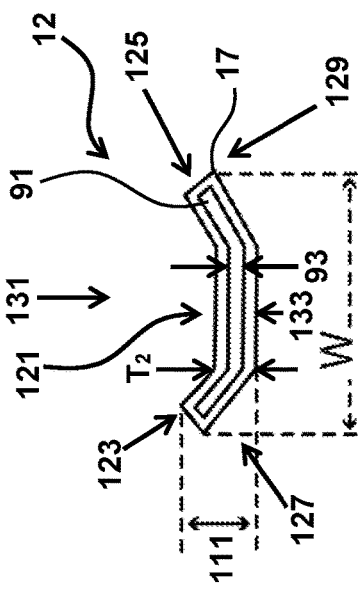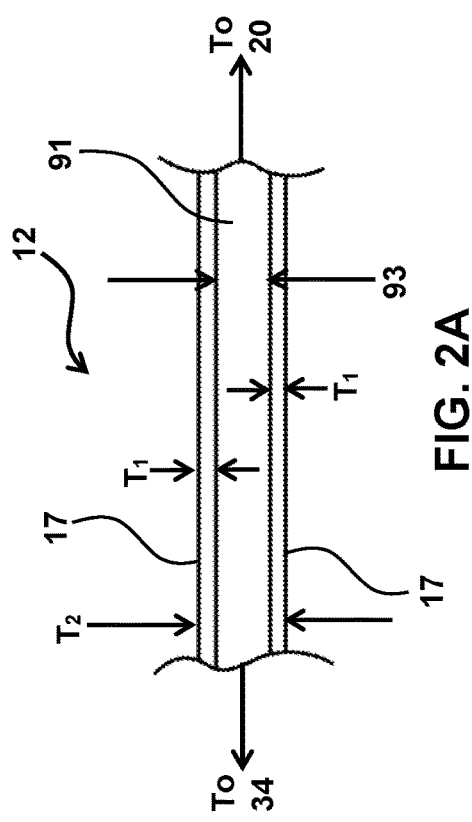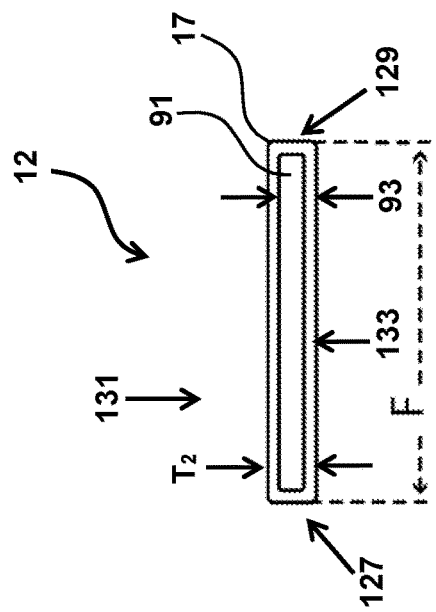

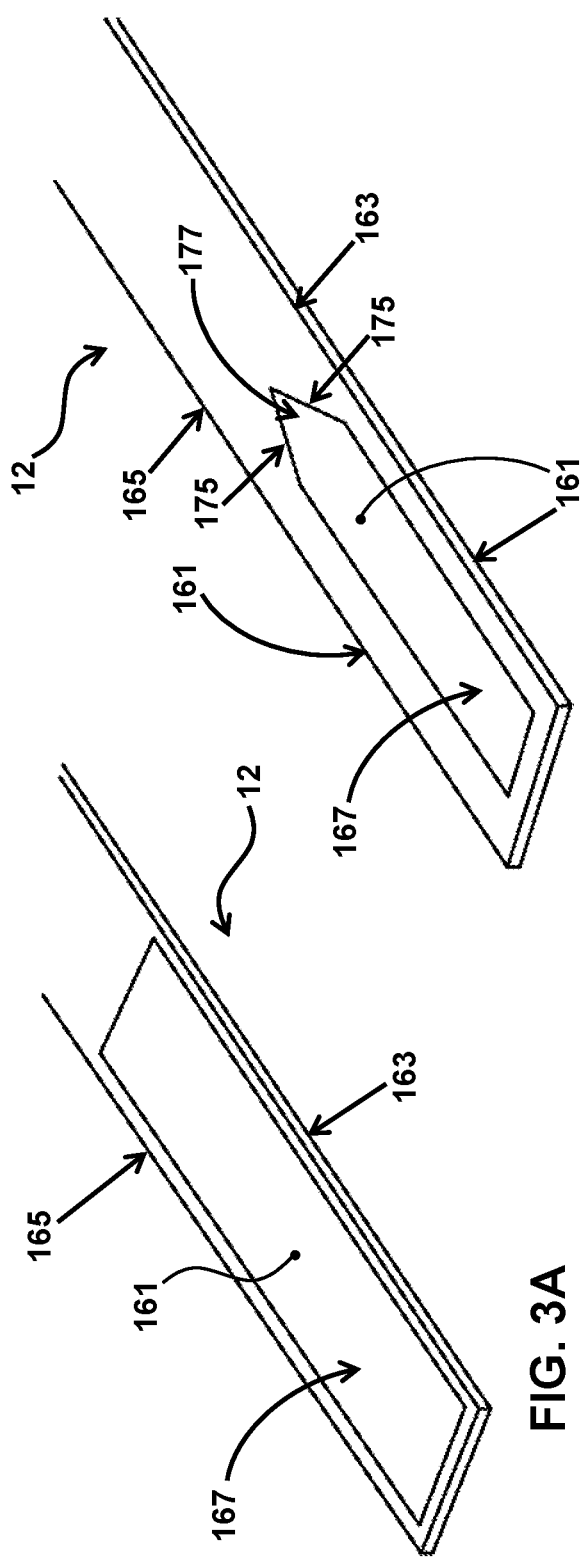

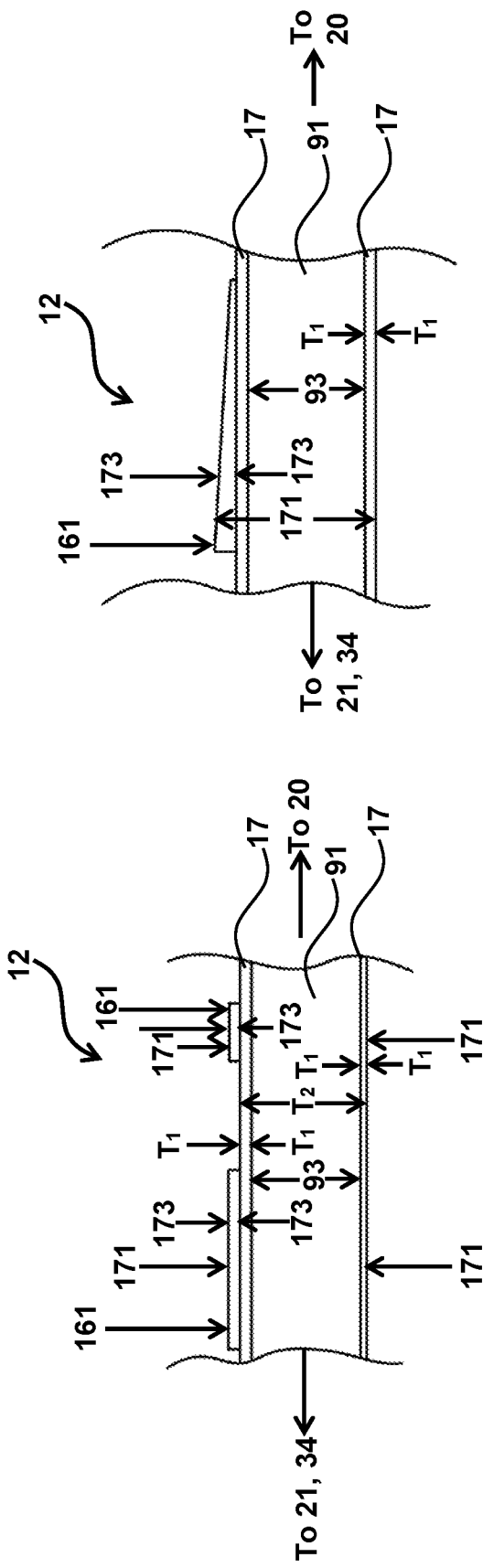

SELF-RETRACTING TAPE RULE

CROSS-REFERENCE TO RELATED APPLICATIONS

This application is a continuation-in-part of co-pending U.S. patent application Ser. No. 16/246,919, filed Jan. 14, 2019, the entire contents of which is hereby incorporated by reference.

BACKGROUND OF THE INVENTION

1. Field of the Invention

The present disclosure relates to a self-retracting tape rule.

2. Description of Related Art

Self-retracting tape rules often have ink printed measurement indicia on a tape rule blade with relatively thick protective polymer coatings. A typical tape rule assembly includes an elongated metal tape rule blade that is mounted on a reel rotatably disposed within a housing. The blade is wound on a reel in the housing by an internal coil spring. To measure a work-piece or distance, a length of the blade is pulled out of the housing to span the work-piece or distance to be measured so that gradation lines and/or numbers printed on the blade can be read. To measure a distance between two objects or surfaces, a blade hook at a free end of the blade may be temporarily secured or placed against an object or surface. There is a need in the tool industry for a self-retracting tape rule with improved utility.

SUMMARY OF EMBODIMENTS OF THE INVENTION

Aspects of the present disclosure relate to self-retracting tape rules and corresponding methods to assemble the self-retracting tape rules. The tape rules comprise an elongated tape rule blade, a reel, a spring, a lock, a housing, and/or other components. The elongated tape rule blade is configured for measurement. The elongated tape rule blade has measurement indicia thereon. The reel is configured to retract the elongated tape rule blade from an extended position to a wound position. The spring is configured to apply a rotational bias to the reel that rotates the reel to retract the elongated tape rule blade into the wound position. The lock is configured to selectively engage the elongated tape rule blade to maintain the elongated tape rule blade in the extended position. The housing is configured to house the elongate tape rule blade, the reel, the spring, and the lock.

In some embodiments, the elongated tape rule blade comprises a metal substrate and a non-polymer coating. The non-polymer coating is configured to provide one or more of color, environmental protection, and/or abrasion resistance to the elongated tape rule blade. In some embodiments, the coating has a thickness of less than 0.001 inches. In some embodiments, the coating has a thickness equal to or less than $1/1000$ of a width of the elongated tape rule blade. In some embodiments the coating has a thickness equal to or less than $1/7$ of a thickness of the elongated tape rule blade. In some embodiments, a weight of the coating comprises less than or equal to 1.8% of a weight of the elongated tape rule blade.

In some embodiments, the coating comprises a ceramic material.

In some embodiments, the coating comprises a ceramic physical vapor deposition (PVD) coating (e.g., a titanium nitride (TiN)) ceramic PVD coating on the elongated tape rule blade.

In some embodiments, the coating comprises plating on the metal substrate of the elongated tape rule blade.

In some embodiments, the coating comprises an anodized portion of the metal substrate of the elongated tape rule blade.

In some embodiments, the coating comprises a metallic physical vapor deposition (PVD) coating on the elongated tape rule blade.

In some embodiments, the elongated tape rule blade comprises metal reinforcements metallurgically bonded to the elongated tape rule blade. The metal reinforcements are bonded at or near a free end of the elongated tape rule blade such that a cross sectional thickness of the elongated tape rule blade and the metal reinforcements is thicker than a cross sectional thickness of the elongated tape rule blade alone. In some embodiments, the metal reinforcements are located proximate to a hook coupled to the free end of the elongated tape rule blade. In some embodiments, the metal reinforcements are located along edges of the elongated tape rule blade at or near the free end of the elongated tape rule blade. In some embodiments, the metal reinforcements are metallurgically bonded to the elongated tape rule blade by laser deposition. In some embodiments, the metal reinforcements are located below or on one or more coating layers on the elongated tape rule blade.

In some embodiments, the measurement indicia comprise locally annealed portions of the metal substrate or the (e.g., metal) coating of the elongated tape rule blade that create color contrasts between the metal substrate and the annealed material and/or the coating and the annealed material. In some embodiments, the metal coating includes the locally annealed portions that create color contrasts between the annealed portions and the metal substrate and/or the coating. In some embodiments, the locally annealed portions of the coating are translucent or transparent. In some embodiments, the locally annealed portions of the coating are opaque. In some embodiments, the locally annealed portions of the metal substrate or the coating of the elongated tape rule blade have different light reflective properties compared to other portions of the metal substrate or the coating.

In some embodiments, the metal substrate and the coating are different colors. In some embodiments, the measurement indicia comprise visible portions of the metal substrate. The visible portions are visible through localized gaps in the coating. In some embodiments, the localized gaps in the coating are formed by locally removing material from the coating. In some embodiments, the localized gaps in the coating are formed by uncoated portions of the metal substrate. In some embodiments, the uncoated portions of the metal substrate comprise areas where the coating was prevented from bonding to the metal substrate by resist material.

In some embodiments, the measurement indicia comprise voids in the metal substrate. The voids are filled with a coating material having a contrasting color. In some embodiments, the measurement indicia comprise voids in the metal substrate and/or the coating layer. In some embodiments, the coating material that fills the voids has a contrasting color relative to the metal substrate and/or the coating layer.

In some embodiments, the metal substrate has a surface texture configured to change an appearance of the coating relative to an appearance of the coating on an as-rolled surface finish of the metal substrate. In some embodiments, the changed appearance of the coating comprises gloss, matte, eggshell, satin, or flat.

In some embodiments, the measurement indicia are formed in the substrate by impinging the substrate with pulsed radiation having an ultraviolet, visible, or infrared wavelength, a pulse width of less than 20 picoseconds, a power of less than 100 Watts, and/or a repetition rate up to 100 gigahertz.

In some embodiments, the measurement indicia are formed in the substrate by impinging the substrate with radiation from a picosecond laser.

In some embodiments, the measurement indicia comprise portions of the substrate with local nanostructuring of the surface, relative to other portions of the substrate. These nanostructures may or may not be entirely subsurface. The nanostructuring may be configured to trap or absorb light to create color contrasts with the other portions of the substrate. In some embodiments, a portion of the nanostructures may rise a very small level above the nominal surface of the substrate. These nanostructures may not be perceptible to human touch, but may be visible by means of a scanning electron microscope, for example.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where:

FIG. 2A illustrates a cross-sectional view of the blade;

FIG. 2B shows a transverse cross-sectional view of the blade taken through an extended portion of the blade;

FIG. 2C shows a transverse cross-sectional view of the blade taken through a portion of the blade when the blade is in a flattened configuration;

FIG. 3A illustrates metal reinforcements bonded to the blade;

FIG. 3B also illustrates metal reinforcements bonded to the blade;

FIG. 3C illustrates a cross-sectional thickness of the blade and metal reinforcements together compared to a cross-sectional thickness of the blade alone;

FIG. 3D illustrates a cross-sectional thickness of a metal reinforcement.

DETAILED DESCRIPTION OF EXEMPLARY EMBODIMENTS OF THE INVENTION

Self-retracting tape rule blades usually have ink-printed measurement indicia with paint and other polymer coatings provided for color, ink wear resistance, and overall abrasion resistance. The polymer coatings are usually thick relative to a metal substrate of a blade. The thick coatings require consideration when designing other aspects of a tape rule (e.g., how long the tape, may be, the size and arrangement of components within a tape rule housing, etc.) Even with the thick coatings, typical blades tend to kink, crack, or break near a free end of the blade.

Figure 1A:
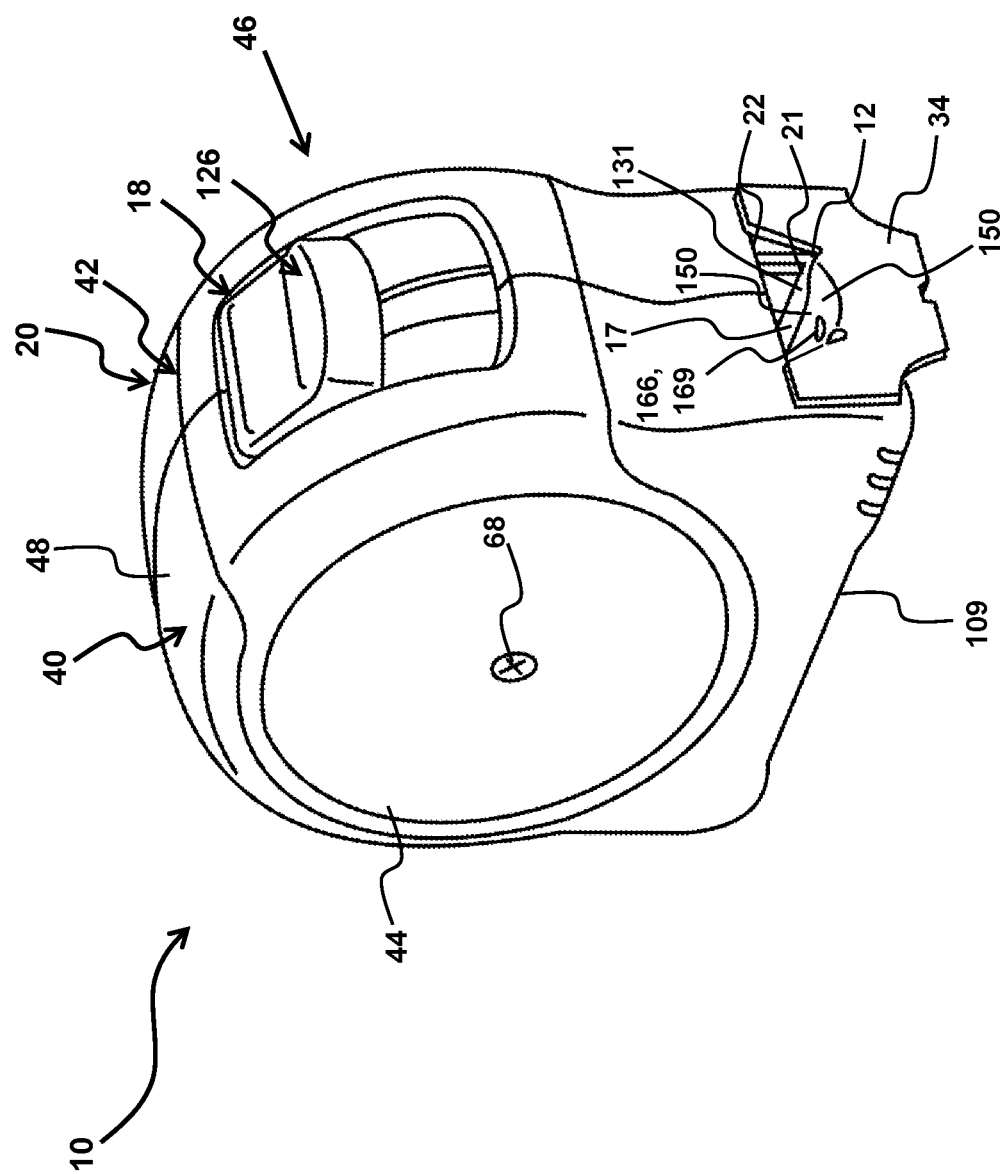
FIG. 1A illustrates a perspective view of a self-retracting tape rule.
Figure 1B:
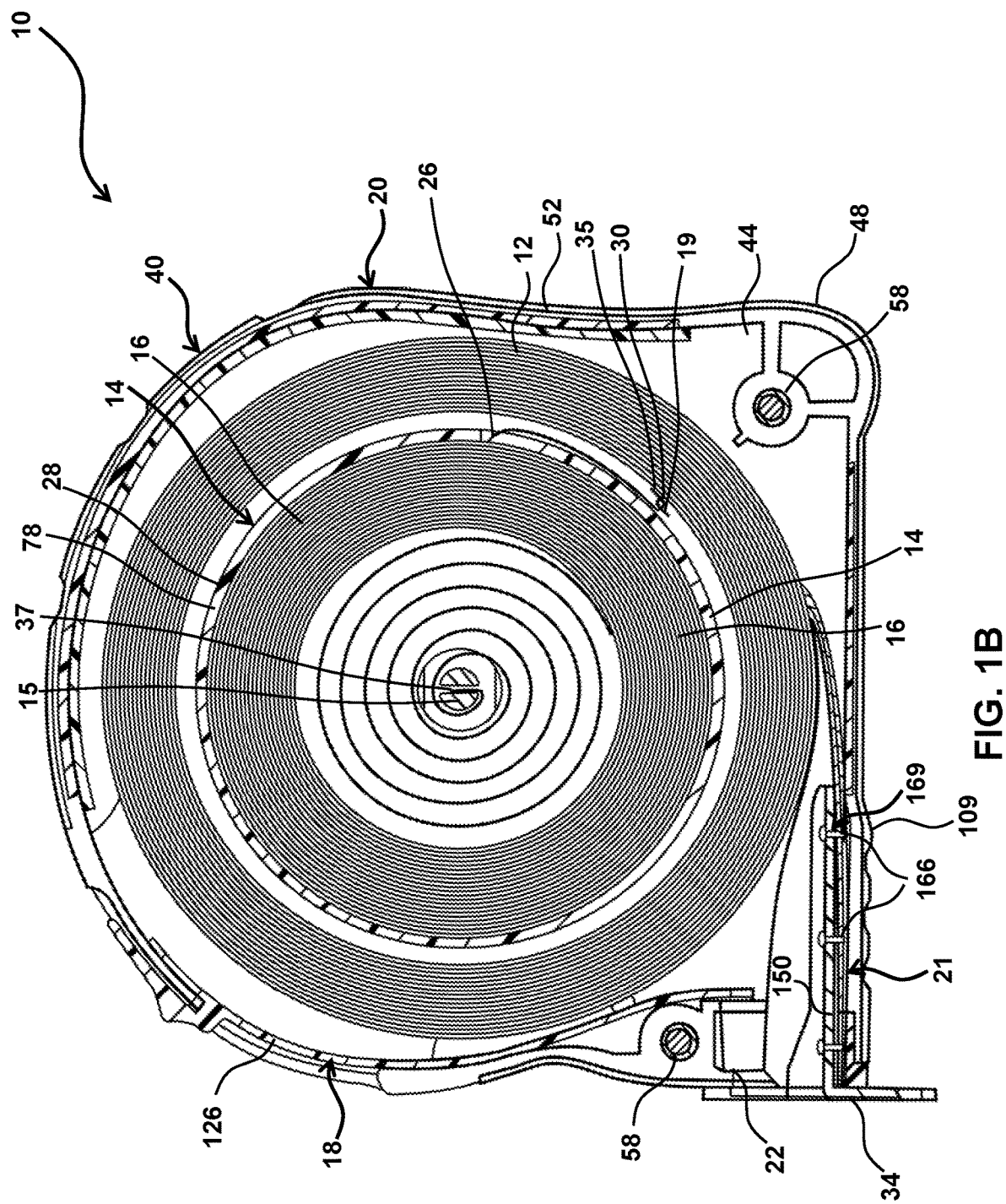
FIG. 1B illustrates a cross-sectional view of the self-retracting tape rule.
Figure 1C:
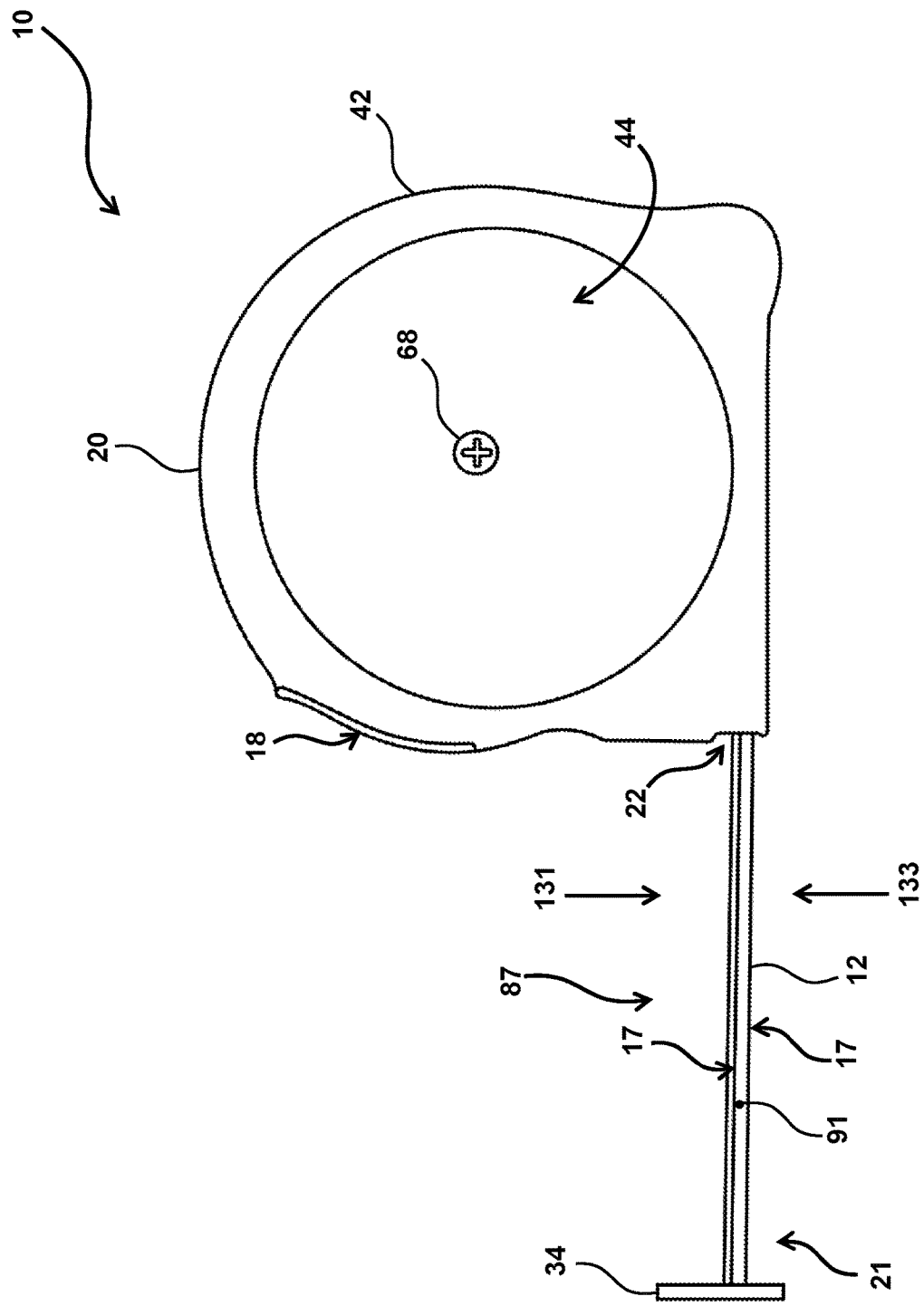
FIG. 1C illustrates a blade of the self-retracting tape rule in a partially extended position.

FIG. 1A-1C illustrate a self-retracting tape rule 10. In some embodiments, the self-retracting tape rule 10 of the present disclosure may provide enhanced color, enhanced wear, and/or enhanced abrasion resistance with a relatively thin non-polymer coating. In one embodiment, self-retracting tape rule 10 need not use traditional ink printing methods and instead can include measurement indicia formed by altering the non-polymer coating and/or a metal substrate of the tape rule 10 blade. In some embodiments, as described herein, self-retracting tape rule 10 includes metallic reinforcements metallurgically bonded to blade 12 to reduce or eliminate issues with kinking, cracking, and breaking. In addition, because of the relatively thin, non-polymer coating, a surface finish appearance of blade 12 of tape rule 10 may be adjusted by imparting a surface finish on a metal substrate of the blade, without having to treat or alter the coating adhered to the blade.

FIGS. 1A (perspective view) and 1B (cross-sectional view) illustrate a self-retracting tape rule 10. Tape rule 10 includes a housing 20, a reel 14 rotatably mounted in housing 20, an elongated tape rule blade 12 wound on reel 14 and extendable through an opening 22 in housing 20. Blade 12 has a distal end 21 with a hook 34 coupled to blade 12 at distal end 21. Tape rule 10 also includes a spring 16 within housing 20 configured to rotate reel 14 in housing 20 in a direction to wind up blade 12, and a lock 18 configured to be manually actuated to hold blade 12 in any position of outward (away from housing 20) extension.

Elongated tape rule blade 12 is configured for measurement. Elongated tape rule blade 12 has measurement indicia thereon. In some embodiments, blade 12 includes a ribbon of metal (e.g., steel) and a (e.g., top) surface of blade 12 includes the measurement indicia. The measurement indicia may include measuring lines, digits, and/or other indicia for measuring lengths and/or distances. Blade 12 is configured to be wound on reel 14, and distal end 21 of blade 12 is configured to extend away from housing 20 through an opening 22 provided in housing 20 (as shown, for example, in FIGS. 1A and 1B).

In some embodiments, blade 12 is coupled to hook 34. Blade 12 is coupled to hook 34 at or near distal end 21 of blade 12. As shown in FIGS. 1A-1B, hook 34 is coupled to end 21 of blade 12 with a mounting portion 150 engaging a first (e.g., concave, or upper as described below) side of end 21 of blade 12. In some embodiments, mounting portion 150 is provided with holes 166. A plurality of rivets 169 may extend through holes 166 to mount hook 34 to blade 12. In some embodiments, hook 34 and/or mounting portion 150 may be similar to and/or the same as a hook and/or mounting portion described in U.S. Pat. No. 8,584,373, which is hereby incorporated by reference in its entirety.

FIG. 1C illustrates blade 12 in a partially extended position 87. Blade 12 is generally movable between a fully retracted position (e.g., as shown in FIGS. 1A and 1B) and a fully extended position (not shown). It can be appreciated from FIGS. 1A, 1B, and 1C (and the additional description below) that as blade 12 is unwound from reel 14, spring 16 is wound more tightly around the reel spindle 15 (described below). This winding of spring 16 around spindle 15 stores energy in spring 16 to provide spring powered rewinding of blade 12 around reel 14 when the extended blade 12 is released.

Figure 2E:
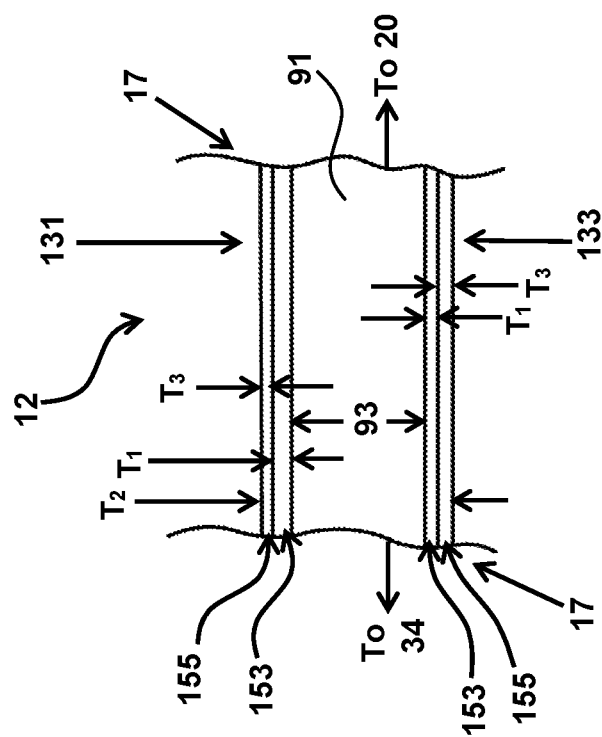
FIG. 2E illustrates the blade formed with a plurality of coating layers.

FIG. 2A-2E illustrate various views of blade 12. FIG. 2A illustrates a cross-sectional view of blade 12 (sectioned along a length of blade 12). Blade 12 comprises a metal substrate 91, a non-polymer coating 17, and/or other components. In some embodiments, blade 12 is formed from a ribbon of sheet metal that is shaped during manufacturing. In some embodiments, as shown in FIG. 2B, the ribbon of sheet metal is shaped to have a generally arcuate or concavo-convex transverse cross-section. In some embodiments, the thickness 93 of the ribbon of sheet metal used to form blade 12 (metal substrate 91) may be about 0.0040 to about 0.0200 inches, for example.

When a portion of blade 12 is wound about reel 14 (FIG. 1A, 1B), the wound portion has a substantially flat transverse cross-section and the wound layers of the coiled blade provide the wound blade with an abutting volute coil configuration. When blade 12 is wound around reel 14 (FIG. 1A, 1B), it is configured to have the flat cross-section, and when the blade 12 is withdrawn from housing 20 to measure an object, it returns to the concavo-convex cross-section shown in FIG. 2B. FIG. 2B shows a transverse cross-sectional view taken through an extended portion of blade 12. FIG. 2C shows a transverse cross-sectional view taken through a portion of blade 12 when blade 12 is in a flattened configuration. Blade 12 has a curved or arcuate width W (FIG. 2B) when blade 12 is in an extended (concavo-convex cross-section) configuration and has a width F (FIG. 2C) when blade 12 is in a flattened configuration. The concavo-convex cross-sectional configuration (FIG. 2B) of blade 12 includes a generally flat or generally arcuate central section 121 and integral flat or arcuate end sections 123 and 125. These sections may be arranged in any combination. For example, blade 12 may include an arcuate central section 121 and flat end sections 123 and 125. As another example, blade 12 may include a flat central section 121 and arcuate end sections 123 and 125. In some embodiments, the radii of curvature for end sections 123 and 125 are greater than the radius of curvature (if there is one) of central section 121. In some embodiments, concavo-convex cross-sectional configuration (FIG. 2B) may have a height 111 of greater than or equal to 0.250 inches, for example. In some embodiments, blade 12 may not include a concavo-convex cross-section, and/or may include any other cross-sectional configurations.

Distal end 21 (FIG. 1A-1C) of blade 12 is frequently handled by users. This handling can over time cause the numbering and markings provided on blades of typical systems to wear off or become difficult to read. In contrast, non-polymer coating 17 of the tape rule 10 reduces or prevents such wear because the measurement indicia are formed in or by non-polymer coating 17 in tape rule 10. Additionally or alternatively, the measurement indicia may be formed in or by metal substrate 91, and coating 17 covers metal substrate 91. There is no separate printing of measurement indicia required in tape rule 10 (e.g., as described below). In some embodiments, non-polymer coating 17 covers the whole length of metal substrate 91. In some embodiments, non-polymer coating 17 covers one or more portions of metal substrate 91. In some embodiments, a thickness of non-polymer coating 17 is substantially constant along a length of blade 12. Non-polymer coating 17 is configured to provide color, environmental protection, abrasion resistance, and/or other properties to blade 12.

In some embodiments, non-polymer coating 17 is on one side 131, 133 or the other of metal substrate 91. In some embodiments, as shown in FIGS. 2B and 2C, non-polymer coating 17 extends beyond transverse edge sections 127 and 129 on both sides 131 and 133 of metal substrate 91 and surrounds metal substrate 91. In some embodiments, a thickness of coating 17 is substantially uniform on both sides 131 and 133. In some embodiments, coating 17 is thicker on one side or the other. In some embodiments, coating 17 has a substantially uniform thickness on one side (131 or 133), and varying thickness on the other side (e.g., the other one of 131 or 133). In some embodiments, coating 17 has a varying thickness on both sides.

Figure 2D:
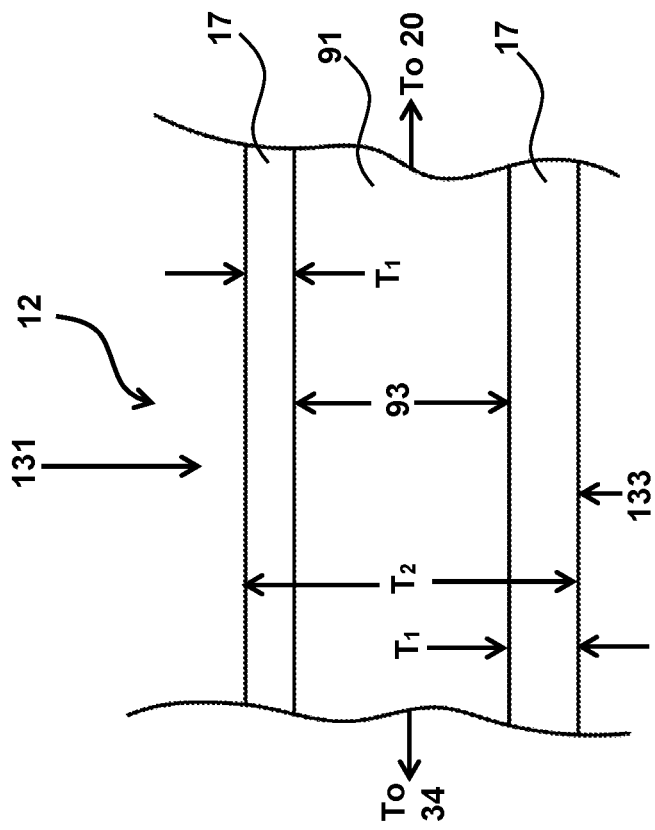
FIG. 2D illustrates an enlarged view of a coating and a metal substrate of the blade.

An enlarged view of coating 17 and metal substrate 91 is illustrated in FIG. 2D. Like FIG. 2A, FIG. 2D illustrates a cross-sectional view of blade 12 sectioned along a length of blade 12. As described above, in some embodiments, non-polymer coating 17 may only be on one side 131, 133 or the other of metal substrate 91. In some embodiments, as shown in FIG. 2D, non-polymer coating 17 (e.g., extending beyond transverse edge sections 127 and 129 on both sides 131 and 133 of metal substrate 91 as shown in FIGS. 2B and 2C) is located on both sides 131 and 133 of metal substrate 91. In some embodiments, a thickness $T_1$ of coating 17 is substantially uniform on both sides 131 and 133. In some embodiments, coating 17 has a thickness $T_1$ of less than 0.0010 inches. In some embodiments, coating 17 has a thickness $T_1$ equal to or less than 1/1000 of a width (e.g., W shown in FIG. 2B or F shown in FIG. 2C) of elongated tape rule blade 12. In some embodiments, coating 17 has a thickness $T_1$ equal to or less than 1/7 of an overall thickness $T_2$, or thickness 93 of metal substrate 91, of elongated tape rule blade 12. In some embodiments, thickness 93 may range from about 0.0045 inches to about 0.0056 inches, for example. In some embodiments, $T_1$ ranges from about 0.0010 inches to about 0.0025 inches, for example. In some embodiments, these thicknesses and/or other dimensions may be measured with a micrometer at multiple stages of processing, via optical measurements from cut and polished cross sections, and/or via other methods.

In some embodiments, a weight of coating 17 comprises less than or equal to 1.8% of a weight of blade 12. In some embodiments, the weight of coating 17 comprises less than or equal to 1.0% of the weight of the blade 12. In some embodiments, a weight of coating 17 comprises less than or equal to 0.5% of a weight of blade 12. In some embodiments, determining the weight of coating 17, metal substrate 91, and/or blade 12 overall comprises determining a width (e.g., W or F shown in FIGS. 2B and 2C), a thickness (e.g., $T_1$, $T_2$, and/or 93 shown in FIG. 2D), a density (of coating 17, metal substrate 91, or both), a volume (of coating 17, metal substrate 91, or both), and/or other characteristics of a predetermined length (e.g., about 100 inches) of blade 12.

The weight may be determined based on the thickness, width, and the density determinations; or the volume and the density determinations, for example. By way of a non-limiting example, the weight of coating 17, metal substrate 91, and/or blade 12 may be determined by weighing 100 inches of blade 12 to three decimal places of precision (in grams), optically measuring dimensions (e.g., of metal substrate 91) on a cut an polished cross section of blade 12, determining a volume of steel from the dimensional (e.g., width thickness and length) measurements, and/or other operations. The weight of metal (steel) substrate 91 may be determined based on the density. In some embodiments, the weight determination may be repeated on multiple blade 12 samples of the same predetermined length (e.g., 12-inch sections) and aggregated (e.g., averaged). It should be noted that the example lengths and calculations described in the above paragraph are representative of many other possible examples and are not intended to be limiting.

In some embodiments, coating 17 comprises a physical vapor deposition (PVD) coating on metal substrate 91. PVD is a deposition process used to deposit a thin film or coating (e.g., coating 17) on a substrate (e.g., metal substrate 91). PVD may refer to many different thin film deposition techniques where metal is vaporized and deposited on a substrate. During PVD, a coating metal is vaporized under high vacuum and then condensed on an electrically conducting substrate. PVD coating 17 may be applied after heat treatment and/or any other material preparation processes performed on metal substrate 91, and/or at other times. The measurement indicia may be marked on blade 12 before, during, or after the PVD (or other) coating process (as described below).

In some embodiments, the PVD coating 17 is a thin ceramic or metallic coating on metal substrate 91. PVD coating 17 is thinner and more abrasion resistant compared to paint and other protective coatings traditionally used for tape rule blades. In some embodiments, the PVD coating 17 comprises titanium nitride (TiN), titanium aluminum nitride (TiAlN), aluminum titanium nitride (AlTiN), aluminum chromium nitride (AlCrN), and/or other PVD coatings. These ceramic, for example, coatings may be referred to as "reactive" PVD coatings because they are formed by a reaction between a metallic species (titanium, aluminum, chromium) and pure nitrogen gas. They may be distinct from sputtered metal PVD coatings, where there is no reaction between the metallic species and a deliberately introduced gas. In some embodiments, PVD coating 17 may provide color, durability, wear resistance, reduced friction, and/or other properties to blade 12. By way of non-limiting examples of some of the advantages of some of these coatings, titanium nitride coating 17 may have a gold color appearance. An aluminum titanium nitride coating 17 may have a high hardness compared to other coatings. A titanium aluminum nitride coating may be a softer coating compared to other coatings but may be less prone to chipping. Other advantages exist, and a particular coating 17 material may be selected based on one of these example properties and/or any other properties of a particular coating 17.

In some embodiments, coating 17 comprises plating on metal substrate 91 of elongated tape rule blade 12. Like PVD, plating may be used to coat a thin metallic coating 17 onto metal substrate 91. Plating may be an electrically based process (e.g., electroplating), a chemically based process (e.g., electroless plating), and/or a combination of both. For example, plating coating 17 onto metal substrate 91 may comprise providing an electrical charge to metal substrate 91 and an opposite charge to metal ions in a chemical solution that surrounds metal substrate 91. The opposing charges may cause the metal ions to bond to metal substrate 91 to form coating 17. In some embodiments, plating may include fusing coating 17 to metal substrate 91 using heat and pressure.

In some embodiments, coating 17 comprises one or more anodized portions of metal substrate 91 (up to an including all of metal substrate 91) of elongated tape rule blade 12. Like PVD and plating, anodization may be used to coat a thin metallic coating 17 onto metal substrate 91. Anodization may be configured to facilitate formation of an oxide layer on metal substrate 91. Anodization may be an electrolytic passivation process. During anodization, metal substrate 91 may be used to form an anode in an electrolytic solution. When an electrical current is passed through the solution, hydrogen may be released at a corresponding cathode, and oxygen at the surface of metal substrate 91. This may cause an oxide layer to form on metal substrate 91.

In some embodiments, coating 17 comprises a ceramic material. In some embodiments, coating 17 comprises a ceramic coating formed with the ceramic material. The ceramic material and/or coating 17 may be an oxide layer, a ceramic material coupled to metal substrate 91, TiN, ZCN, and/or other ceramic materials and/or coatings. In some embodiments, a ceramic coating 17 may be formed by heat treating metal substrate 91 (e.g., to form an oxide layer), spraying or sputter coating a ceramic material onto metal substrate 91 (e.g., a ceramic plasma spray applied to metal substrate 91, melted ceramic particles fired at metal substrate 91 at high speed), fusing ceramic material to metal substrate 91 at high temperature (e.g., a ceramic powder heated and condensed on metal substrate 91), incorporating a ceramic into a polymer and applying the mixture with a traditional coating process (e.g., such that the ceramic particles provide abrasion resistance while the polymer would bond the ceramic to the blade), a ceramic power may be dusted on the surface of the blade and the blade with the ceramic may then be processed through a roller to embed the ceramic into the steel, and/or other ceramic coating formation processes.

In some embodiments, coating 17 comprises a plurality of layers. For example, FIG. 2E illustrates blade 12 formed by metal substrate 91 and a plurality of coating layers 153, 155, etc. (the illustration of two layers is not intended to be limiting). In some embodiments, layers 153 and 155 have thicknesses $T_1$ and $T_3$, respectively. In some embodiments, $T_1$ and $T_3$ may be the same on one or both sides 131 and 133 of blade 12. In some embodiments the thicknesses of layers 153 and 155 may be different (e.g., on one side or both sides 131, 133 of blade 12). In some embodiments, coating 17 (and/or individual layers of coating 17) may be formed with a gloss, matte, or other surface finish.

In some embodiments, thickness $T_1$ of layer 153 and/or thickness $T_3$ of layer 155 is substantially uniform on both sides 131 and 133. In some embodiments, thickness $T_1$ of layer 153 and thickness $T_3$ of layer 155 together is less than 0.001 inches. In some embodiments, thickness $T_1$ of layer 153 and thickness $T_3$ of layer 155 together is equal to or less than 1/1000 of a width (e.g., W shown in FIG. 2B or F shown in FIG. 2C) of elongated tape rule blade 12. In some embodiments, thickness $T_1$ of layer 153 and thickness $T_3$ of layer 155 together is equal to or less than 1/7 of an overall thickness $T_2$, or thickness 93 of metal substrate 91, of blade 12.

In some embodiments, layers 153 and 155 may be individually attached to metal substrate 91 and/or a previously attached layer (e.g., layer 155 may be attached to layer 153, etc.) in an iterative process. In some embodiments, layers 153 and 155 may be formed from different coating materials (e.g., different PVD coatings) and/or using different coating processes (e.g., plating, PVD, anodization, etc.). In some embodiments, layers 153 and 155 may be formed from the same coating material (e.g., the same PVD coating) and/or using the same coating process (e.g., PVD).

In some embodiments, elongated tape rule blade 12 comprises metal reinforcements metallurgically bonded to blade 12. FIGS. 3A and 3B illustrate perspective views of metal reinforcements 161 bonded to blade 12. Metal reinforcements 161 comprise additional metal (e.g., metal that was not part of blade 12) locally bonded to blade 12. Metal reinforcements 161 are bonded along the edges 163, 165 of blade 12, toward the middle 167 of blade 12, and/or at other locations. Typical blades in prior tape rule assemblies are prone to tearing, kinking, and breaking. Often the tearing, kinking, and breaking occurs at or near a free end of the blade. With blade 12 of tape rule 10, metal reinforcements 161 are configured to reduce (e.g., compared to prior blade assemblies) or prevent tearing, kinking, and breaking of blade 12. Metal reinforcements 161 are bonded at or near a free (distal) end 21 (FIG. 1A-1C) of blade 12 to reduce or prevent tearing, kinking, or breaking of blade 12. In some embodiments, at or near end 21 of blade 12 comprises within about six inches of end 21 and/or hook 34 (FIG. 1A-1C) for example. In some embodiments, metal reinforcements 161 are located proximate to hook 34 (FIG. 1A-1C) coupled to end 21 of blade 12. In some embodiments, metal reinforcements 161 are located proximate to holes in blade 12 and/or other features configured to facilitate coupling of hook 34 to blade 12.

Metal reinforcements 161 may be metallurgically bonded to blade 12 such that a cross-sectional thickness 171 of blade 12 (metal substrate 91 and thickness 17) and metal reinforcements 161 together is thicker than a cross sectional thickness $T_2$ of blade 12 alone. This is illustrated in FIG. 3C. FIG. 3C illustrates a cross-sectional view of blade 12 sectioned along a length of blade 12. The thicker thickness 171 may be located at or near a central portion of blade 12 (FIGS. 3A and 3B), at or near the edges of blade 12 (FIG. 3B), and/or in other locations. It should be noted that FIG. 3C illustrates metal reinforcements 161 on top of coating 17. This is not intended to be limiting. In some embodiments, metal reinforcements 161 are located below or on one or more coating 17 layers on elongated tape rule blade 12. For example, metal reinforcements 161 may be metallurgically bonded directly to metal substrate 91 underneath coating 17, before coating 17 is applied, or coating 17 may be applied after metal reinforcements 161 are bonded to metal substrate 91.

In some embodiments, as shown in FIG. 3D a cross-sectional thickness 173 of a metal reinforcement 161 may be tapered as it extends along or across blade 12. FIG. 3D illustrates a cross-sectional view of blade 12 sectioned along a length of blade 12. In FIG. 3D, thickness 173 is tapered as it extends along (from a location closer to end 21 toward a location closer to housing 20) blade 12. Tapering may be used for one or more instances of metal reinforcements 161 along blade 12.

In some embodiments, metal reinforcements 161 are metallurgically bonded to elongated tape rule blade 12 by laser deposition and/or other bonding operations. In some embodiments, using multiple laser deposition heads that work together, a relatively wide band (e.g., covering most or all of a width of blade 12) of metal reinforcement 161 (e.g., FIG. 3A) may be bonded to a surface of blade 12. For example, a wide band of metal reinforcement 161 may be bonded to a surface of blade 12 in or around holes in blade 12 configured to facilitate coupling of hook 34. In some embodiments, by varying which laser deposition heads are active, along with the speed at which material passes underneath a given head, thickness 173 of metal reinforcements 161 may be tapered (e.g., as shown in FIG. 3D). Similarly, a width 175 (FIG. 3B) of a metal reinforcement 161 may also be tapered. For example, as shown in FIG. 3B width 175 of an end 177 of a metal reinforcement 161 is tapered to a point as the metal reinforcement 161 extends along blade 12. In some embodiments, one or more different metals may be used to form an individual metal reinforcement 161. In some embodiments, one or more different metals may be used for different metal reinforcements 161. In some embodiments, metal reinforcements 161 may be formed from powdered metals. In some embodiments, the measurement indicia are formed (e.g., as described herein) on top of and/or in metal reinforcements 161.

The measurement indicia comprise lines of various sizes and shapes that indicate measurement increments, numbers that correspond to the measurement increments, and/or other measurement indicia. In some embodiments, the measurement indicia comprise laser marked portions of a surface of blade 12 (e.g., coating 17 and/or metal substrate 91). The laser marked portions may comprise annealed portions, etched and/or engraved portions, non-photothermally marked portions of blade 12, and/or other marks. For example, in some embodiments, the measurement indicia may be formed in metal substrate 91 with a picosecond laser marking process. In some embodiments, a picosecond laser marking process facilitates the formation of the measurement indicia in substrate 91 without photothermal effects such as the formation of an oxide layer, or material removal from substrate 91. A picosecond laser marking process may be and/or include a laser marking process where a picosecond laser applies high power pulses to the substrate. These pulses may be configured to switch between the off state and on state with a laser pulse length measured in picoseconds or in some embodiments femtoseconds, resulting in clean crisp indicia and minimal localized thermal damage (localized heat effected zones) to the larger portion of the substrate material. In some embodiments, typical switching frequencies for these lasers may be about 50 kHz to 1 MHz, for example.

Without limiting any other embodiments described herein, there may be a distinct advantage to the use of a picosecond laser for the marking of stainless steel, compared to use of a conventional nanosecond pulse (e.g., annealing or oxidation type) marking laser, and/or means for marking. For example, a picosecond laser mark typically may not reduce the corrosion resistance of stainless steel in the area of the mark. In contrast, a nanosecond (annealing or oxidation) laser mark typically does reduce the corrosion resistance of the stainless steel in the area of the mark. To restore the corrosion resistance of the stainless steel, a subsequent passivation operation may be performed (which may be a dip in a nitric acid solution). This passivation step can counterproductively reduce the contrast of the nanosecond laser mark, making it less visible. This may make conventional nanosecond (annealing or oxidation) laser marks not well suited for stainless steel materials.

In some embodiments, the measurement indicia comprise portions of substrate 91 with local nanostructured surface changes relative to other portions of substrate 91. The local nanostructured surface changes may be configured to trap or absorb light to create color contrasts with the other portions of the substrate, for example. These local nanostructured surface changes may trap or absorb light such that the measurement indicia appear black, for example, and/or other colors. In some embodiments, the local nanostructured surface changes comprise an annealed metallic structure or an oxidized metallic structure, and/or other structures. Anneal marking (e.g., causing the annealed metallic structure) or oxidation marking (e.g., causing the oxidized metallic structure) may occur as a laser applies heat to the substrate or coating in a manner that does not vaporize the material such as in ablation (removal). The heated material reacts with the oxygen in the air creating an oxide layer that may have different colors depending on the chemistry of the substrate being marked. Steel, stainless steel, titanium, etc. all create an oxidation layer that is dark in color, as do may other materials. Because this oxidation layer is heating below the vaporization temperature of the material, little to no waste material is produced and the coating or substrate surface remains intact without gaps from removed material. In some embodiments, anneal or oxidation marking may include controlled, relatively lower energy heating (e.g., from a laser), that may be obtained by slowly introducing the heat so as to control the temperature increase and not heat so much that the substrate or coating layer is vaporized. In some embodiments, relatively higher energy can be applied by quickly pulsing a higher power laser (e.g. picosecond pulses). Typically (but not always), picosecond lasers do not produce appreciable heating of the substrate.

In some embodiments, a picosecond laser marking process uses pulsed radiation. In some embodiments, a picosecond laser marking process uses ultraviolet, visible, or infrared radiation. In some embodiments, a picosecond laser marking process has a radiation pulse width of less than about 20 picoseconds. In some embodiments, the radiation in a picosecond laser marking process has a power of less than about 100 Watts. In some embodiments, the radiation in a picosecond laser marking process has a power of less than about 50 Watts. In some embodiments, the radiation in a picosecond laser marking process has a power of less than about 10 Watts. In some embodiments, the radiation in a picosecond laser marking process has a power of less than about 7 Watts. In some embodiments, a picosecond laser marking process has a pulse repetition rate of up to about 100 gigahertz (GHz). In some embodiments, these and other picosecond laser parameters facilitate the formation of the measurement indicia in substrate 91 substantially without photothermal effects (e.g., an oxide layer, material removal, etc.) on substrate 91. For example, the measurement indicia may be formed on substrate 91 by impinging substrate 91 with pulsed radiation having an ultraviolet, visible, or infrared wavelength, a pulse width of less than 20 picoseconds, a power of less than 100 Watts, and a repetition rate up to 100 gigahertz. In some embodiments, the present system may include ultrashort pulse (picosecond) lasers operating at 1064 nm wavelength in the infrared region of the electromagnetic spectrum. In some embodiments, a 532 nm wavelength ultrashort pulse laser operating in the green visible spectrum may be used.

In some embodiments, the measurement indicia comprise locally annealed portions of metal substrate 91 or (e.g., metal) coating 17 of elongated tape rule blade 12. In some embodiments, the annealing is performed with a laser and/or other annealing equipment configured to locally heat the surface of coating 17 and/or metal substrate 91 to mark (anneal) the measurement indicia on coating 17 and/or metal substrate 91. In some embodiments, metal substrate 91 may be locally annealed prior to receiving coating 17. In some embodiments, coating 17 may be annealed after being applied to metal substrate 91.

The locally annealed portions create color contrasts between metal substrate 91 and coating 17. In some embodiments, the locally annealed portions of metal substrate 91 or coating 17 of blade 12 have different light reflective properties (e.g., to create different looking colors) compared to other portions of metal substrate 91 or coating 17. The measurement indicia are formed by the differences in color. For example, coating 17 and/or metal substrate 91 may have various locally annealed areas shaped as tape rule graduation marks (e.g., of various sized to indicate inches, half-inches, quarter inches, etc.), shaped as numbers (e.g., a locally annealed area may be formed in the shape of a "1", or "2", etc.), and/or have other shapes. In some embodiments, only 17 coating includes the locally annealed portions that create color contrasts between metal substrate 91 and coating 17. In some embodiments, the locally annealed portions of coating 17 are translucent or transparent (so that the color of metal substrate 91 is visible underneath). In some embodiments, the locally annealed portions of coating 17 are opaque, blocking the color of metal substrate 91 from view. In these embodiments, the local opaque and/or transparent or translucent areas may be shaped as the graduation marks and/or the numbers, etc. described above.

Figure 4A:
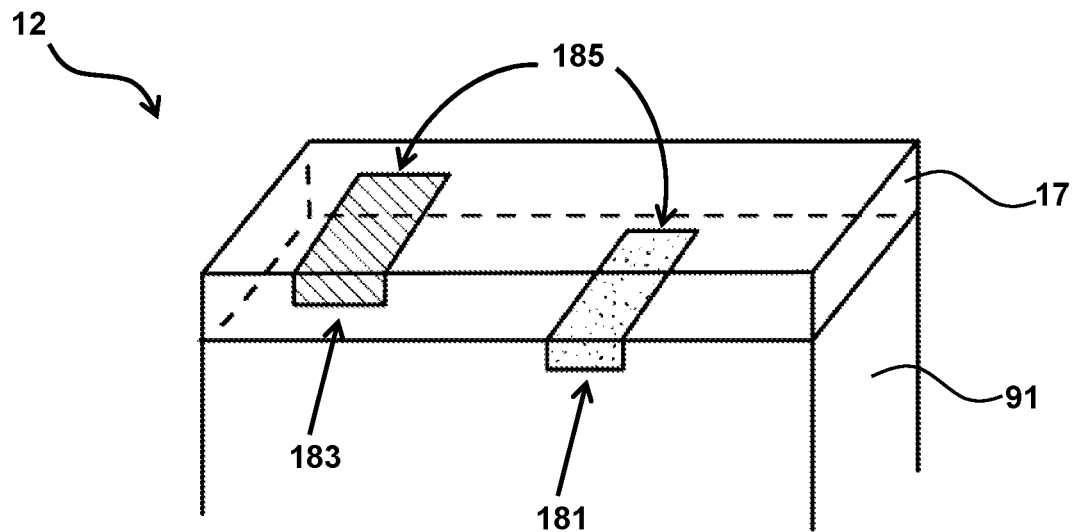
FIG. 4A illustrates measurement indicia comprising locally annealed portions of the metal substrate or the coating of the blade.
Figure 4B:
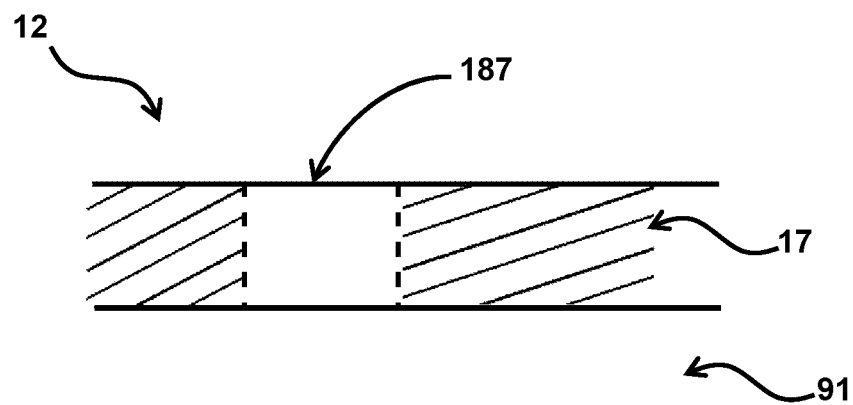
FIG. 4B illustrates measurement indicia comprising locally annealed transparent or translucent portions of the coating of the blade.

By way of two non-limiting examples, FIGS. 4A and 4B illustrate measurement indicia 185 comprising locally annealed portions 181 of metal substrate 91 or 183 of coating 17 of elongated tape rule blade 12. FIG. 4A is a perspective view of coating 17 and metal substrate 91. As shown in FIG. 4A, the locally annealed portions 181, 183 create color contrasts between metal substrate 91 and coating 17. In some embodiments, the locally annealed portions 181, 183 of metal substrate 91 or coating 17 of blade 12 have different light reflective properties (e.g., to create different looking colors) compared to other portions of metal substrate 91 or coating 17. Measurement indicia 185 are formed by the differences in color. For example, coating 17 and/or metal substrate 91 may have various locally annealed areas 181, 183 shaped as tape rule graduation marks 185 (e.g., of various sized to indicate inches, half-inches, quarter inches, etc.), shaped as numbers (e.g., a locally annealed area may be formed in the shape of a "1", or "2", etc.), and/or have other shapes.

FIG. 4B illustrates a side view of coating 17 and metal substrate 91. In some embodiments, as shown in FIG. 4B, locally annealed portions 187 of coating 17 may be translucent or transparent (so that the color of metal substrate 91 is visible underneath). In these embodiments, the local opaque and/or transparent or translucent areas may be shaped as the graduation marks or the numbers, etc. described above.

Figure 4C:
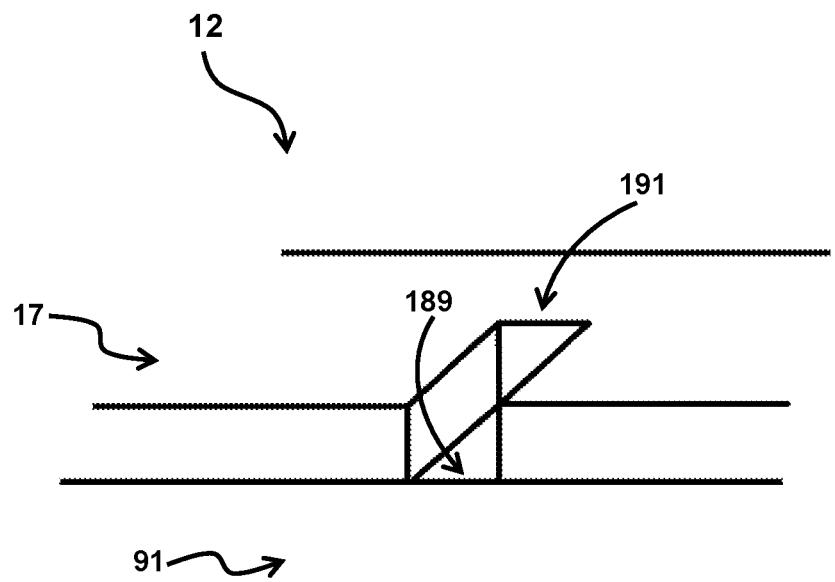
FIG. 4C illustrates visible portions of the metal substrate visible through gaps in the coating forming the measurement indicia.

As described above, the measurement indicia may comprise visible portions of metal substrate 91 (e.g., which may be a different color than coating 17). In some embodiments, the visible portions are visible through localized gaps in coating 17. FIG. 4C illustrates a perspective view of coating 17 on metal substrate 91. FIG. 4C illustrates visible portions 189 of metal substrate 91 visible through localized gaps 191 in coating 17. As shown in FIG. 4C, visible portions 189 and gaps 191 may form the measurement indicia (e.g., a graduation mark as shown in FIG. 4C). It should be noted that in some embodiments, similarly, the measurement indicia may comprise visible portions of an inner (or first) layer of coating 17 visible through one or more outer (second, third, fourth, etc.) layers of coating 17. In some embodiments, the visible portions of an inner layer are visible through localized gaps in one or more of the outer layers of coating 17.

In some embodiments, localized gaps 191 in coating 17 (and/or one or more of the layers of coating 17) are formed by locally removing material from coating 17 (and/or a layer of coating 17). For example, local portions of coating 17 material may be removed mechanically, potions of an outer layer of coating 17 may be abolished (e.g., apply two coating layers of contrasting color and remove portions of an outer layer to reveal the inner layer), local portions of one or more layers may be removed chemically, local portions of one or more layers may be removed via machining, local portions of one or more layers may be removed via laser processing, and/or material may be removed in other ways.

In some embodiments, localized gaps 191 in coating 17 (and/or one or more of the layers of coating 17) are formed by uncoated portions of metal substrate 91 and/or similarly uncoated portions of an inner layer of coating 17. In some embodiments, the uncoated portions of metal substrate 91 and/or one or more layers of coating 17 comprise areas where coating 17 and/or a subsequent layer of coating 17 was prevented from bonding to the metal substrate or a previous coating layer by resist material, and/or using other techniques. For example, a first coating layer having a first color may be applied to metal substrate 91. A positive or negative resist corresponding to the measurement indicia may be applied to the first coating layer. A second coating layer having a contrasting color may be added, and then the resist may be removed to expose the contrasting color of the first coating layer. In this example, the exposed color is configured to be in the pattern of the measurement indicia. As another example, the first coating layer may be applied to metal substrate 91 only in localized areas (e.g., that correspond to the measurement indicia). The second coating may be applied to metal substrate 91 and the first coating layer but may be configured to bond only to metal substrate 91 and not the first coating layer.

In some embodiments, the measurement indicia comprise voids in metal substrate 91. The voids may be created by selectively engraving metal substrate 91 with a pattern corresponding to the measurement indicia and/or removing material from metal substrate 91 with other techniques. In some embodiments, the voids are filled with a coating 17 material having a contrasting color compared to metal substrate 91. In some embodiments, the measurement indicia comprise the voids in metal substrate 91 and/or a coating 17 layer. For example, after engraving metal substrate 91, metal substrate 91 may be evenly coated with a first coating layer. Where there are voids (or depressions) in the coating layer caused by the engraving, the voids in the coating layer are filled with a second coating layer. In some embodiments, the (second) coating layer material that fills the voids (in the first layer) has a contrasting color relative to metal substrate 91 and/or the first coating layer.

Figure 4D:
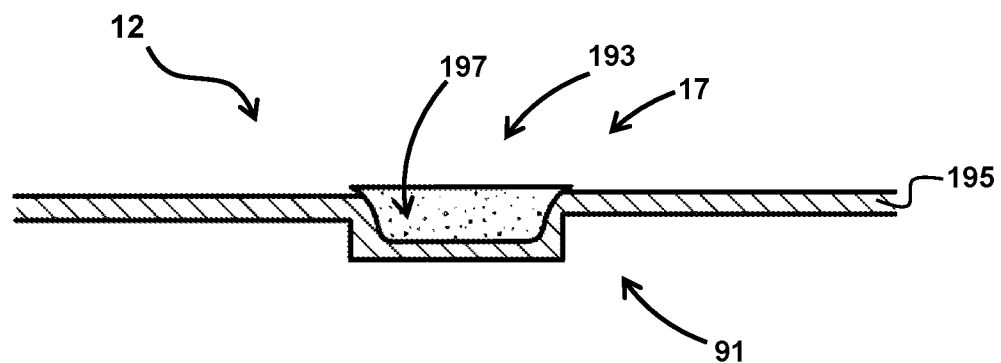
FIG. 4D illustrates measurement indicia comprising voids in the metal substrate and a coating layer.

This is illustrated in FIG. 4D. FIG. 4D illustrates measurement indicia comprising a void 193 in metal substrate 91 and a coating 17 layer 195. As shown in FIG. 4D, after engraving metal substrate 91 (to create void 193), metal substrate 91 may be evenly coated with a first coating layer 195. Where there is a void (or depression) 193 in coating layer 195 caused by the engraving, void 193 in coating layer 195 is filled with a second coating layer 197. In some embodiments, second coating layer 197 that fills void 193 (in first layer 195) has a contrasting color relative to metal substrate 91 and/or first coating layer 195.

As another example, metal substrate 91 may be evenly coated with a first coating layer (e.g., 195 shown in FIG. 4D). The first coating layer may be locally deformed to form voids or depressions (similar to void 193 shown in FIG. 4D) in the coating layer. The voids in the coating layer may be filled with the second coating layer (e.g., 197 shown in FIG. 4D).

The surface texture of metal substrate 91 may affect a final visual appearance of blade 12. As the thickness of coating 17 increases, the effect the surface texture of metal substrate 91 has on the visual appearance decreases. However, as described above, coating 17 is thin relative to typical coatings on typical tape rule blades. In some embodiments, metal substrate 91 has a surface texture configured to change an appearance of coating 17 relative to an appearance of coating 17 on an as-rolled surface finish of metal substrate 91. In some embodiments, the changed appearance of coating 17 comprises gloss, matte, eggshell, satin, flat, and/or other surface finishes. In some embodiments, a surface texture may be imparted to metal substrate 91 using polishing, abrasion, imprinting, laser marking, etching, rolling, and/or other surface treatment operations. In some embodiments, imparting a surface texture comprises changing a surface roughness of metal substrate 91. In some embodiments, a surface texture may be imparted prior to coating metal substrate 91. For example, an abraded surface finish imparted to metal substrate 91 before coating may produce a matte appearance of coating 17. A polished surface finish imparted to metal substrate 91 before coating may produce a gloss (or high gloss) appearance of coating 17.

Figure 5A:
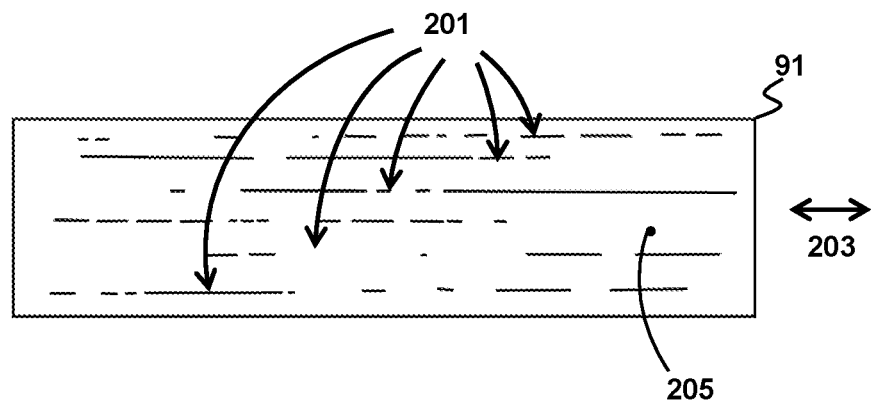
FIG. 5A illustrates an as-rolled surface finish of the metal substrate.
Figure 5B:
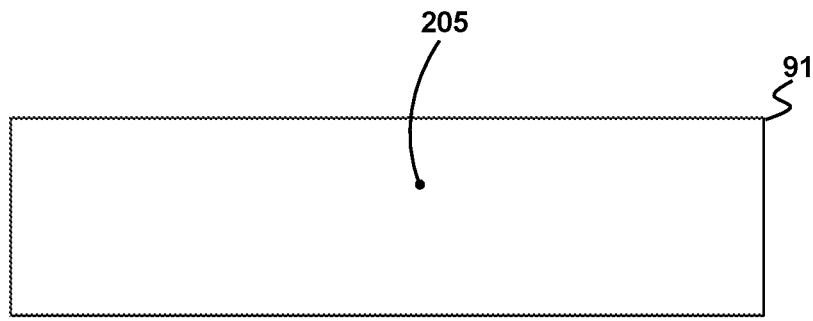
FIG. 5B illustrates a polished surface finish of the metal substrate.
Figure 5C:
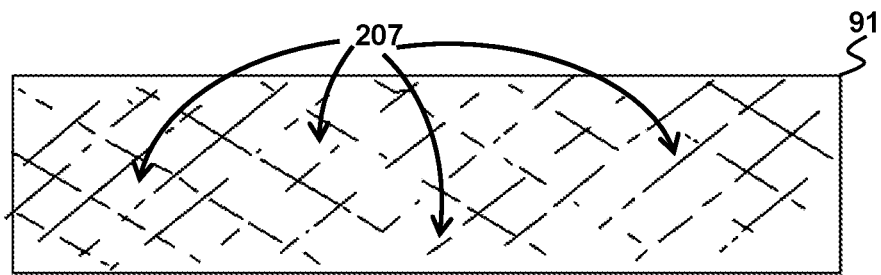
FIG. 5C illustrates an abraded surface finish of the metal substrate.

By way of a non-limiting example, FIG. 5A-5C illustrate an as-rolled surface finish of metal substrate 91 (FIG. 5A), a polished surface finish of metal substrate 91 (FIG. 5B), and an abraded surface finish of metal substrate 91 (FIG. 5C). As shown in FIG. 5A rolling marks 201 from a rolling direction 203 may be visible on a surface 205 of metal substrate 91 in an as-rolled condition. In contrast, surface 205 of metal substrate 91 in a polished condition as shown in FIG. 5B may not include any marks at all, and instead be a smooth, highly reflective surface. FIG. 5C illustrates an example abraded surface 205 of metal substrate 91. Abrasion marks 207 may have a pattern selected by an operator of abrasion equipment, a pattern determined by the equipment, and/or other patterns. The particular pattern shown in FIG. 5C is not intended to be limiting.

Returning to FIG. 1A-1C, reel 14 is configured to retract elongated tape rule blade 12 from an extended position to a wound position. Reel 14 is rotatably coupled to housing 12. Blade 12 is configured to be wound on reel 14. In some embodiments, reel 14 is mounted in housing 20 by an axle or reel spindle 15. In some embodiments, reel 14 has a slot or opening 26 in a central cylindrical wall portion 28 thereof. One end 19 of blade 12 terminates in a hook-like structure 30 that engages a first longitudinal end 35 of spring 16 to couple end 19 of blade 12 to spring 16. In some embodiments, reel 14 includes two reel members 78 (and another corresponding reel member on an opposite side of reel 14) that provide circular side walls on sides of spindle 15 about which blade 12 is wound.

Spindle 15 extends axially within housing 20 between housing 20 members 40 and 42 (described below). Reel 14 is rotatably mounted on spindle 15 for bi-directional rotational movement of reel 14. Axially extending spindle 15 may be fixed at or near a central portion of housing 20 (e.g., as shown in FIG. 1B). Each end of the spindle 15 is interiorly threaded to receive bolts 68 therein. Bolts 68 extend through central holes formed in respective adjacent housing 20 end walls 44 and 46, and threadedly engage internal threading in each end of spindle 15. Spindle 15 is internally slotted to receive one end 37 of spring 16 to secure end 37 of spring 16 to spindle 15.

Spring 16 is configured to apply a rotational bias to reel 14 that rotates reel 14 to retract elongated tape rule blade 12 into the wound position. Spring 16 is located between housing 20 and reel 14 and configured to rotate reel 14 with respect to housing 20 in a direction to wind blade 12 about reel 14 into housing 20. Spring 16 is generally enclosed within wall portion 28 of reel 14 (FIG. 1B). End 35 of spring 16 extends through opening 26 and engages end 19 of blade 12. End 37 of spring 16 engages (e.g., via a hook shape formed by end 37) a corresponding slot formed in spindle 15 to fix end 37 of spring 16 to spindle 15. In some embodiments, spring 16 is a thin, flat ribbon of metal (e.g., e.g., steel). In some embodiments, spring 16 is a coil spring and/or other springs.

Lock 18 is configured to selectively engage elongated tape rule blade 12 to maintain elongated tape rule blade 12 in the extended position. In some embodiments, lock 18 is configured to be manually actuated to hold blade 12 in any position of outward extension (e.g., away from housing 20 opening 22). Lock 18 is configured to release blade 12 from any extended position in which blade 12 is held. In some embodiments, lock 18 includes a moveable member 126 mounted on housing 20 and configured for movement in two opposing directions between a normally inoperative position (where blade 12 may move freely between extended and retracted positions) and a holding position (where blade 12 is prevented from moving). In some embodiments, lock 18 may be similar to and/or the same as, for example, the lock described in U.S. Pat. No. 6,324,769, which is hereby incorporated by reference in its entirety.

Housing 20 is configured to house elongated tape rule blade 12, reel 14, spring 16, lock 18, and/or other components. In some embodiments, housing 20 is configured to fit in a hand of a user easily and comfortably. In some embodiments, housing 20 is constructed of, for example, a molded plastic material. In some embodiments, housing 20, for example, may have features similar to or the same as features described in U.S. Patent Application Ser. No. 61/475,121, which is hereby incorporated by reference in its entirety.

In some embodiments, housing 20 includes two or more cooperating housing members 40, 42. In some embodiments, housing members 40, 42 include an end wall 44, respectively, and a peripheral wall 48, respectively, extending from a periphery of the end walls and terminating in a free edge 52, respectively. Housing 20 may include a base wall 109, and/or other walls. The pair of cooperating housing members 40, 42 are joined to one another in cooperating relation to form housing 20. When housing 20 members 40, 42 are coupled, the free edges 52 (and another corresponding free edge on the other side of housing 20) are inter-engaged as shown in FIG. 1A. A plurality of axially extending fasteners 58 may extend through one of the housing members 42 and threadedly engage the other housing member 40 at spaced positions in the respective end walls (e.g., 44) adjacent the peripheral walls (e.g., 48).

In some embodiments, a clip (not shown in the figures) may be coupled to one side of housing 20 by fasteners, bolts, and/or other coupling devices. The clip may be used to removably couple tape rule 10 to the belt of a user, or another attachment point. In some embodiments, the belt clip may be made from, for example, a polymer material, a metal material, and/or other materials.

Figure 6:
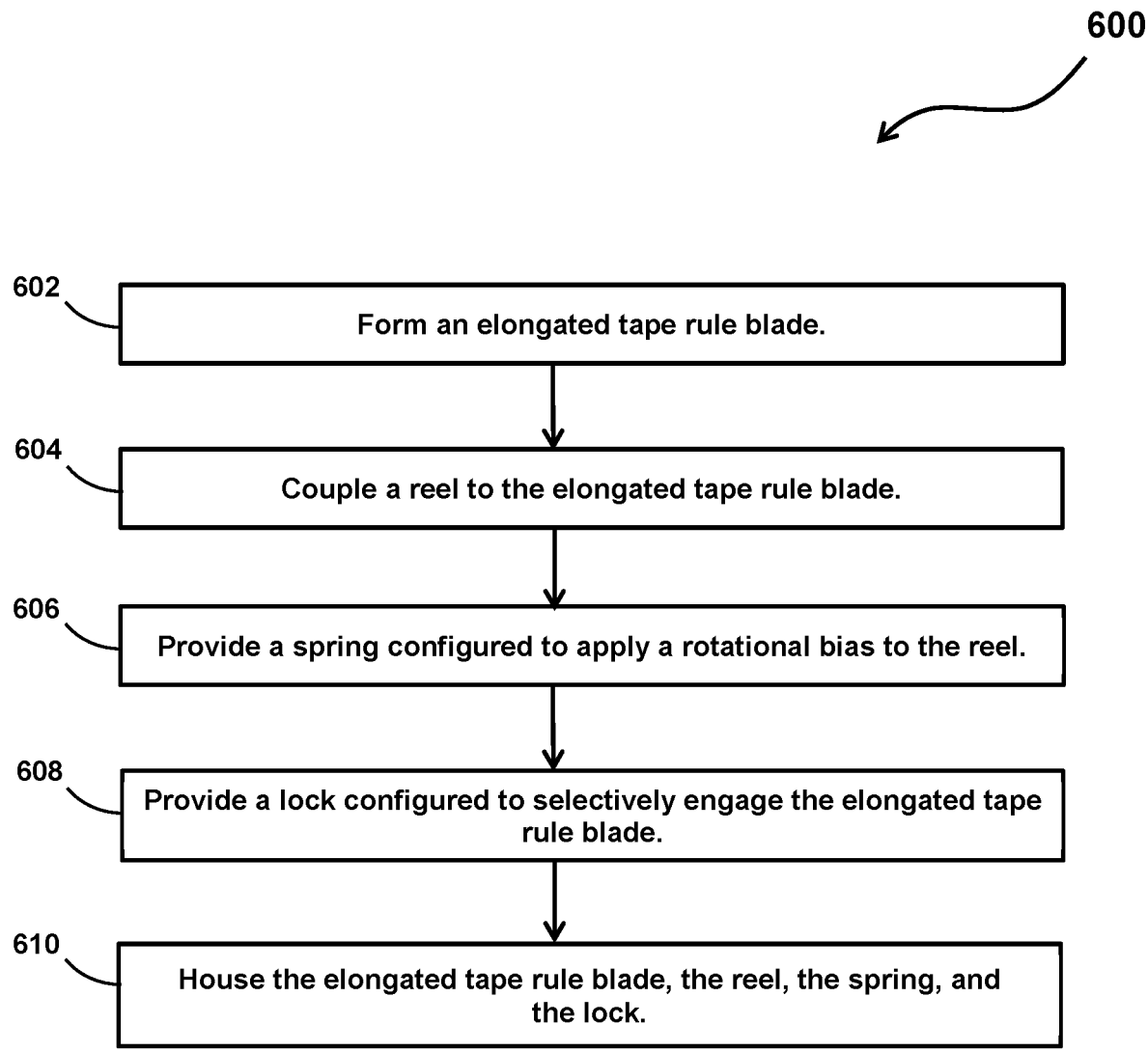
FIG. 6 illustrates a method of assembling a self-retracting tape rule.

FIG. 6 illustrates method 600 for assembling a self-retracting tape rule. The self-retracting tape rule includes an elongated tape rule blade, a reel, a spring, a lock, a housing, and/or other components. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

At an operation 602, the elongated tape rule blade is formed. The elongated tape rule blade is configured for measurement. The elongated tape rule blade has measurement indicia thereon. In some embodiments, the forming of operation 602 comprises coating a metal substrate of the elongated tape rule blade with a non-polymer coating. The non-polymer coating is configured to provide one or more of color, environmental protection, and/or abrasion resistance to the elongated tape rule blade, for example. In some embodiments, the non-polymer coating has a thickness of less than 0.001 inches. In some embodiments, the non-polymer coating has a thickness equal to or less than $\frac{1}{1000}$ of a width of the elongated tape rule blade. In some embodiments, the non-polymer coating has a thickness equal to or less than $\frac{1}{7}$ of a thickness of the elongated tape rule blade. In some embodiments, a weight of the non-polymer coating comprises less than or equal to 1.8% of a weight of the elongated tape rule blade. In some embodiments, a weight of the non-polymer coating comprises less than or equal to 1% of a weight of the elongated tape rule blade.

In some embodiments, the non-polymer coating comprises a ceramic material. In some embodiments, the forming of operation 602 comprises plating the non-polymer coating on the metal substrate of the elongated tape rule blade. In some embodiments, the forming comprises anodizing at least a portion of the metal substrate of the elongated tape rule blade to form the non-polymer coating. In some embodiments, the forming comprises depositing a metallic physical vapor deposition (PVD) coating on the elongated tape rule blade to form the non-polymer coating. In some embodiments, the PVD coating comprises titanium nitride, titanium aluminum nitride, aluminum titanium nitride, aluminum chromium nitride, and/or other materials. In some embodiments, the forming comprises forming the metal substrate from steel. In some embodiments, the non-polymer coating comprises more than one layer.

In some embodiments, the forming of operation 602 comprises metallurgically bonding metal reinforcements to the elongated tape rule blade at or near a free end of the elongated tape rule blade. The metal reinforcements are configured such that a cross sectional thickness of the elongated tape rule blade and the metal reinforcements is thicker than a cross sectional thickness of the elongated tape rule blade alone. In some embodiments, the forming comprises locating the metal reinforcements proximate to a hook coupled to the free end of the elongated tape rule blade. In some embodiments, the forming comprises locating the metal reinforcements along edges of the elongated tape rule blade at or near the free end of the elongated tape rule blade. In some embodiments, the forming comprises metallurgically bonding the metal reinforcements to the elongated tape rule blade by laser deposition. In some embodiments, the forming comprises locating the metal reinforcements below or on one or more coating layers on the elongated tape rule blade.

In some embodiments, the forming of operation 602 comprises locally annealing portions of the metal substrate or the (e.g., metal) coating of the elongated tape rule blade to create color contrasts between the metal substrate and the coating. These color contrasts are configured to form the measurement indicia. In some embodiments, the coating includes the locally annealed portions that create color contrasts between the metal substrate and the metal coating. In some embodiments, the locally annealed portions of the coating are translucent or transparent. In some embodiments, the locally annealed portions of the metal coating are opaque. In some embodiments, the locally annealed portions of the metal substrate or the coating of the elongated tape rule blade have different light reflective properties compared to other portions of the metal substrate or the metal coating.

In some embodiments, the forming of operation 602 comprises forming the metal substrate and the coating with different colors. In some embodiments, the forming of operation 602 comprises forming the measurement indicia as visible portions of the metal substrate. The coating is formed, for example, such that visible portions of the metal substrate are visible through localized gaps in the coating. In some embodiments, the localized gaps in the coating are formed by locally removing material from the coating. In some embodiments, the localized gaps in the coating are formed by uncoated portions of the metal substrate. In some embodiments, the uncoated portions of the metal substrate are formed by preventing the coating from bonding to the metal substrate with resist material.

In some embodiments, the forming of operation 602 comprises laser marking portions of a surface of the blade to form the measurement indicia. The laser marked portions may comprise annealed portions, etched and/or engraved portions, non-photothermally marked portions of blade 12, and/or other marks. For example, in some embodiments, the measurement indicia may be formed in the metal substrate with a picosecond laser marking process. In some embodiments, a picosecond laser marking process facilitates the formation of the measurement indicia in the substrate without photothermal effects such as the formation of an oxide layer, or material removal from substrate.

In some embodiments, the forming of operation 602 comprises including voids in the metal substrate and/or the coating to form the measurement indicia. The voids in the metal substrate and/or the coating are filled with a (e.g., second) coating material having a contrasting color. In some embodiments, the void filling (second) coating material has a contrasting color relative to the metal substrate and/or the coating layer.

In some embodiments, the forming of operation 602 comprises imparting a surface texture on the metal substrate. Imparting the surface finish may comprise polishing the metal substrate, abrading the metal substrate, and/or performing other operations on the metal substrate. The surface texture is configured to change an appearance of the coating relative to an appearance of the coating on an as-rolled surface finish of the metal substrate. In some embodiments, the changed appearance of the coating comprises gloss, matte, eggshell, satin, or flat.

Operation 602 may be performed for an elongated tape rule blade that is the same as or similar to elongated tape rule blade 12 (shown in FIG. 1 and described herein).

At an operation 604, the reel is coupled to the elongated tape rule blade. The reel is configured to retract the elongated tape rule blade from an extended position to a wound position. Operation 604 may be performed with a reel that is the same as or similar to reel 14 (shown in FIG. 1 and described herein).

At an operation 606, the spring is provided. The spring is configured to apply a rotational bias to the reel. The rotational bias is configured to rotate the reel to retract the elongated tape rule blade into the wound position. Operation 606 may be performed with a spring that is the same as or similar to spring 16 (shown in FIG. 1 and described herein).

At an operation 608, the lock is provided. The lock is configured to selectively engage the elongated tape rule blade. The selective engagement is configured to maintain the elongated tape rule blade in the extended position. Operation 608 may be performed by with a lock that is the same as or similar to lock 18 (shown in FIG. 1 and described herein).

At an operation 610, the elongated tape rule blade, the reel, the spring, and the lock are housed. Operation 610 may be performed by a housing that is the same as or similar to housing 20 (shown in FIG. 1 and described herein).

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The present techniques will be better understood with reference to the following enumerated embodiments:

Thin Non-Polymer Blade Coating

1. A self-retracting tape rule, the tape rule comprising: an elongated tape rule blade configured for measurement, the elongated tape rule blade having measurement indicia thereon, the elongated tape rule blade comprising a substrate and a non-polymer coating, the non-polymer coating configured to provide one or more of color, environmental protection, and/or abrasion resistance to the elongated tape rule blade; a reel configured to retract the elongated tape rule blade from an extended position to a wound position; a spring configured to apply a rotational bias to the reel that rotates the reel to retract the elongated tape rule blade into the wound position; a lock configured to selectively engage the elongated tape rule blade to maintain the elongated tape rule blade in the extended position; and a housing configured to house the elongate tape rule blade, the reel, the spring, and the lock.

2. The tape rule of embodiment 1, wherein the coating has a thickness of less than 0.001 inches.

3. The tape rule of embodiment 1, wherein the coating has a thickness equal to or less than 1/1000 of a width of the elongated tape rule blade.

4. The tape rule of embodiment 1, wherein the coating has a thickness equal to or less than 1/7 of a thickness of the elongated tape rule blade.

5. The tape rule of embodiment 1, wherein a weight of the coating comprises less than or equal to 1.8% of a weight of the elongated tape rule blade.

6. The tape rule of embodiment 1, wherein a weight of the coating comprises less than or equal to 1% of a weight of the elongated tape rule blade.

7. The tape rule of embodiment 1, wherein the coating comprises a ceramic material.

8. The tape rule of embodiment 1, wherein the coating comprises plating on the metal substrate of the elongated tape rule blade.

9. The tape rule of embodiment 1, wherein the coating comprises an anodized portion of the substrate of the elongated tape rule blade.

10. The tape rule of embodiment 1, wherein the coating comprises a ceramic or metallic physical vapor deposition (PVD) coating on the elongated tape rule blade.

11. The tape rule of embodiment 10, wherein the PVD coating comprises one or more of copper or a copper alloy (e.g., such as brass or bronze), titanium nitride, titanium aluminum nitride, aluminum titanium nitride, or aluminum chromium nitride.

12. The tape rule of embodiment 1, wherein the substrate is formed from metal.

13. The tape rule of embodiment 1, wherein the substrate is formed from polymer.

14. The tape rule of embodiment 1, wherein the coating comprises more than one layer.

15. The tape rule of embodiment 1, wherein the elongated tape rule blade comprises reinforcements metallurgically bonded to the elongated tape rule blade at or near a free end of the elongated tape rule blade such that a cross sectional thickness of the elongated tape rule blade and the reinforcements is thicker than a cross sectional thickness of the elongated tape rule blade alone.

16. The tape rule of embodiment 1, wherein the measurement indicia comprise locally annealed portions of the substrate or the coating of the elongated tape rule blade that create color contrasts between the substrate and the coating.

17. The tape rule of embodiment 1, wherein the measurement indicia comprise visible portions of the substrate of the elongated tape rule blade, the visible portions being visible through localized gaps in the coating.

18. The tape rule of embodiment 1, wherein the measurement indicia comprise surface voids in material of the elongated tape rule blade.

19. The tape rule of embodiment 1, wherein the substrate has a surface texture configured to change an appearance of the coating relative to an appearance of the coating on an as-rolled surface finish of the substrate.

20. A method for assembling a self-retracting tape rule, the method comprising: forming an elongated tape rule blade configured for measurement, the elongated tape rule blade having measurement indicia thereon, the forming comprising coating a substrate of the elongated tape rule blade with a non-polymer coating, the non-polymer coating configured to provide one or more of color, environmental protection, and/or abrasion resistance to the elongated tape rule blade; coupling a reel to the elongated tape rule blade, the reel configured to retract the elongated tape rule blade from an extended position to a wound position; providing a spring configured to apply a rotational bias to the reel that rotates the reel to retract the elongated tape rule blade into the wound position; providing a lock configured to selectively engage the elongated tape rule blade to maintain the elongated tape rule blade in the extended position; and housing the elongated tape rule blade, the reel, the spring, and the lock with a housing of the self-retracting tape rule.

21. The method of embodiment 20, wherein the non-polymer coating has a thickness of less than 0.001 inches.

22. The method of embodiment 20, wherein the non-polymer coating has a thickness equal to or less than 1/1000 of a width of the elongated tape rule blade.

23. The method of embodiment 20, wherein the non-polymer coating has a thickness equal to or less than 1/7 of a thickness of the elongated tape rule blade.

24. The method of embodiment 20, wherein a weight of the non-polymer coating comprises less than or equal to 1.8% of a weight of the elongated tape rule blade.

25. The method of embodiment 20, wherein a weight of the non-polymer coating comprises less than or equal to 1% of a weight of the elongated tape rule blade.

26. The method of embodiment 20, wherein the non-polymer coating comprises a ceramic material.

27. The method of embodiment 20, wherein the forming comprises plating the non-polymer coating on the substrate of the elongated tape rule blade.

28. The method of embodiment 20, wherein the forming comprises anodizing at least a portion of the substrate of the elongated tape rule blade to form the non-polymer coating.

29. The method of embodiment 20, wherein the forming comprises depositing a metallic physical vapor deposition (PVD) coating on the elongated tape rule blade to form the non-polymer coating.

30. The method of embodiment 29, wherein the PVD coating comprises one or more of titanium nitride, titanium aluminum nitride, aluminum titanium nitride, or aluminum chromium nitride.

31. The method of embodiment 20, wherein the forming comprises forming the substrate from metal.

32. The method of embodiment 20, wherein the forming comprises forming the substrate from polymer.

33. The method of embodiment 20, wherein the non-polymer coating comprises more than one layer.

34. The method of embodiment 20, further comprising metallurgically bonding reinforcements to the elongated tape rule blade at or near a free end of the elongated tape rule blade such that a cross sectional thickness of the elongated tape rule blade and the reinforcements is thicker than a cross sectional thickness of the elongated tape rule blade alone.

35. The method of embodiment 20, further comprising locally annealing portions of the substrate or the non-polymer coating of the elongated tape rule blade to create color contrasts between the substrate and the coating to form the measurement indicia.

36. The method of embodiment 20, wherein the forming comprises forming the measurement indicia as visible portions of the substrate of the elongated tape rule blade, the visible portions being visible through localized gaps in the non-polymer coating.

37. The method of embodiment 20, wherein the forming comprises forming the measurement indicia with surface voids in material of the elongated tape rule blade.
38. The method of embodiment 20, wherein the forming comprises imparting a surface texture to the substrate, the surface texture configured to change an appearance of the non-polymer coating relative to an appearance of the non-polymer coating on an as-rolled surface finish of the substrate.

Blade Reinforcement by Metal Deposition

39. A self-retracting tape rule, the tape rule comprising: an elongated tape rule blade configured for measurement, the elongated tape rule blade having measurement indicia thereon, the elongated tape rule blade comprising reinforcements metallurgically bonded to the elongated tape rule blade at or near a free end of the elongated tape rule blade such that a cross sectional thickness of the elongated tape rule blade and the reinforcements is thicker than a cross sectional thickness of the elongated tape rule blade alone; a reel configured to retract the elongated tape rule blade from an extended position to a wound position; a spring configured to apply a rotational bias to the reel that rotates the reel to retract the elongated tape rule blade into the wound position; a lock configured to selectively engage the elongated tape rule blade to maintain the elongated tape rule blade in the extended position; and a housing configured to house the elongated tape rule blade, the reel, the spring, and the lock.
40. The tape rule of embodiment 39, wherein the reinforcements are located proximate to a hook coupled to the free end of the elongated tape rule blade.
41. The tape rule of embodiment 39, wherein the reinforcements are located along edges of the elongated tape rule blade at or near the free end of the elongated tape rule blade.
42. The tape rule of embodiment 39, wherein the reinforcements are metallurgically bonded to the elongated tape rule blade by laser deposition.
43. The tape rule of embodiment 39, wherein the reinforcements are metallurgically bonded to the elongated tape rule blade by thermal spray.
44. The tape rule of embodiment 39, wherein the reinforcements are located below or on one or more coating layers on the elongated tape rule blade.
45. The tape rule of embodiment 39, wherein the elongated tape rule blade comprises a non-polymer coating configured to provide one or more of color, environmental protection, and/or abrasion resistance to the elongated tape rule blade.
46. The tape rule of embodiment 39, wherein the measurement indicia comprise locally heated portions of a substrate or a coating of the elongated tape rule blade that create color contrasts between the substrate and the coating.
47. The tape rule of embodiment 39, wherein the measurement indicia comprise visible portions of a substrate of the elongated tape rule blade, the visible portions being visible through localized gaps in a coating of the elongated tape rule blade.
48. The tape rule of embodiment 39, wherein the measurement indicia comprise surface voids in material of the elongated tape rule blade.
49. The tape rule of embodiment 39, wherein the elongated tape rule blade comprises a metal substrate and a non-polymer coating, the metal substrate having a surface texture configured to change an appearance of the coating relative to an appearance of the coating on an as-rolled surface finish of the metal substrate.

50. A method for assembling a self-retracting tape rule, the method comprising: forming an elongated tape rule blade configured for measurement, the elongated tape rule blade having measurement indicia thereon, the forming comprising metallurgically bonding reinforcements to the elongated tape rule blade at or near a free end of the elongated tape rule blade such that a cross sectional thickness of the elongated tape rule blade and the reinforcements is thicker than a cross sectional thickness of the elongated tape rule blade alone; coupling a reel to the elongated tape rule blade, the reel configured to retract the elongated tape rule blade from an extended position to a wound position; providing a spring configured to apply a rotational bias to the reel that rotates the reel to retract the elongated tape rule blade into the wound position; providing a lock configured to selectively engage the elongated tape rule blade to maintain the elongated tape rule blade in the extended position; and housing the elongated tape rule blade, the reel, the spring, and the lock with a housing of the self-retracting tape rule.
51. The method of embodiment 50, wherein the forming comprises locating the reinforcements proximate to a hook coupled to the free end of the elongated tape rule blade.
52. The method of embodiment 50, wherein the forming comprises locating the reinforcements along edges of the elongated tape rule blade at or near the free end of the elongated tape rule blade.
53. The method of embodiment 50, wherein the forming comprises metallurgically bonding the reinforcements to the elongated tape rule blade by laser deposition.
54. The method of embodiment 50, wherein the forming comprises metallurgically bonding the reinforcements to the elongated tape rule blade by thermal spray.
55. The method of embodiment 50, wherein the forming comprises locating the reinforcements below or on one or more coating layers on the elongated tape rule blade.
56. The method of embodiment 50, wherein the forming comprises coating the elongated tape rule blade with a non-polymer coating configured to provide one or more of color, environmental protection, and/or abrasion resistance to the elongated tape rule blade.
57. The method of embodiment 50, wherein the forming comprises locally heating at least a portion of a substrate or a coating of the elongated tape rule blade to create color contrasts between the substrate and the coating to form the measurement indicia.
58. The method of embodiment 50, wherein the forming comprises forming the measurement indicia as visible portions of a substrate of the elongated tape rule blade, the visible portions being visible through localized gaps in a coating of the elongated tape rule blade.
59. The method of embodiment 50, wherein the forming comprises forming the measurement indicia with surface voids in material of the elongated tape rule blade.
60. The method of embodiment 50, wherein the forming comprises imparting a surface texture to a metal substrate of the elongated tape rule blade, the surface texture configured to change an appearance of a coating of the elongated tape rule blade relative to an appearance of the coating on an as-rolled surface finish of the metal substrate.

Blade Graduation Marking—Annealing Sub Set

61. A self-retracting tape rule, the tape rule comprising: an elongated tape rule blade configured for measurement, the elongated tape rule blade having measurement indicia thereon, the elongated tape rule blade comprising a substrate and a coating, the measurement indicia comprising locally heated portions of the substrate or the coating of the elongated tape rule blade that create color contrasts between substrate and the coating; a reel configured to retract the elongated tape rule blade from an extended position to a wound position; a spring configured to apply a rotational bias to the reel that rotates the reel to retract the elongated tape rule blade into the wound position; a lock configured to selectively engage the elongated tape rule blade to maintain the elongated tape rule blade in the extended position; and a housing configured to house the elongated tape rule blade, the reel, the spring and the lock.

62. The tape rule of embodiment 61, wherein the coating includes the locally heated portions that create color contrasts between the substrate and the coating.

63. The tape rule of embodiment 61, wherein the locally annealed portions of the coating are translucent or transparent.

64. The tape rule of embodiment 61, wherein the locally heated portions of the coating are opaque.

65. The tape rule of embodiment 61, wherein the locally heated portions of the substrate or the coating of the elongated tape rule blade have different light reflective properties compared to other portions of the substrate or the coating.

66. The tape rule of embodiment 61, wherein the coating of the elongated tape rule blade is configured to provide one or more of color, environmental protection, and/or abrasion resistance to the elongated tape rule blade.

67. The tape rule of embodiment 61, wherein the elongated tape rule blade comprises reinforcements metallurgically bonded to the elongated tape rule blade at or near a free end of the elongated tape rule blade such that a cross sectional thickness of the elongated tape rule blade and the reinforcements is thicker than a cross sectional thickness of the elongated tape rule blade alone.

68. The tape rule of embodiment 61, wherein the elongated tape rule blade comprises a metal substrate and the coating, the metal substrate having a surface texture configured to change an appearance of the coating relative to an appearance of the coating on an as-rolled surface finish of the metal substrate.

69. A method for assembling a self-retracting tape rule, the method comprising: forming an elongated tape rule blade configured for measurement, the elongated tape rule blade having measurement indicia thereon, the forming comprising locally heating portions of a substrate or a coating of the elongated tape rule blade to create color contrasts between the substrate and the coating to form the measurement indicia; coupling a reel to the elongated tape rule blade, the reel configured to retract the elongated tape rule blade from an extended position to a wound position; providing a spring configured to apply a rotational bias to the reel that rotates the reel to retract the elongated tape rule blade into the wound position; providing a lock configured to selectively engage the elongated tape rule blade to maintain the elongated tape rule blade in the extended position; and housing the elongated tape rule blade, the reel, the spring, and the lock with a housing of the self-retracting tape rule blade.

70. The method of embodiment 69, wherein the coating includes the locally heated portions that create color contrasts between the substrate and the coating.

71. The method of embodiment 70, wherein the locally heated portions of the coating are translucent or transparent.

72. The method of embodiment 70, wherein the locally heated portions of the coating are opaque.

73. The method of embodiment 69, wherein the locally annealed portions of the substrate or the coating of the elongated tape rule blade have different light reflective properties compared to other portions of the substrate or the coating.

74. The method of embodiment 69, wherein the coating of the elongated tape rule blade is configured to provide one or more of color, environmental protection, and/or abrasion resistance to the elongated tape rule blade.

75. The method of embodiment 69, wherein the forming comprises metallurgically bonding reinforcements to the elongated tape rule blade at or near a free end of the elongated tape rule blade such that a cross sectional thickness of the elongated tape rule blade and the reinforcements is thicker than a cross sectional thickness of the elongated tape rule blade alone.

76. The method of embodiment 69, wherein the elongated tape rule blade comprises a metal substrate and the coating, the forming comprising imparting a surface texture to the metal substrate configured to change an appearance of the coating relative to an appearance of the coating on an as-rolled surface finish of the metal substrate.

Blade Graduation Marking—Non-Coating or Coating Removal Subset

77. A self-retracting tape rule, the tape rule comprising: an elongated tape rule blade configured for measurement, the elongated tape rule blade comprising a substrate and a coating layer or multiple coating layers, the substrate and the coating layer or multiple coating layers having different colors, the elongated tape rule blade having measurement indicia thereon, the measurement indicia comprising visible portions of the substrate, the visible portions being visible through localized gaps in the coating layer or the multiple coating layers; a reel configured to retract the elongated tape rule blade from an extended position to a wound position; a spring configured to apply a rotational bias to the reel that rotates the reel to retract the elongated tape rule blade into the wound position; a lock configured to selectively engage the elongated tape rule blade to maintain the elongated tape rule blade in the extended position; and a housing configured to house the elongated tape rule blade, the reel, the spring, and the lock.

78. The tape rule of embodiment 77, wherein the localized gaps in the coating are formed by locally removing material from the coating layer or one of the multiple coating layers.

79. The tape rule of embodiment 77, wherein the localized gaps in the coating are formed by uncoated portions of the substrate.

80. The tape rule of embodiment 79, wherein the uncoated portions of the substrate comprise areas where a coating was prevented from bonding to the substrate by resist material.

81. The tape rule of embodiment 77, wherein the localized gaps in the coating are formed by uncoated portions of a sub layer.

82. The tape rule of embodiment 81, wherein the uncoated portions of a sub layer comprise areas where a coating was prevented from bonding to the sub layer by resist material.

83. The tape rule of embodiment 77, wherein the coating layer or the multiple coating layers of the elongated tape rule blade comprise a non-polymer coating configured to provide one or more of color, environmental protection, and/or abrasion resistance to the elongated tape rule blade.

84. The tape rule of embodiment 77, wherein the elongated tape rule blade comprises reinforcements metallurgically bonded to the elongated tape rule blade at or near a free end of the elongated tape rule blade such that a cross sectional thickness of the elongated tape rule blade and the reinforcements is thicker than a cross sectional thickness of the elongated tape rule blade alone.

85. The tape rule of embodiment 77, wherein the elongated tape rule blade comprises a metal substrate and the coating layer or multiple coating layers, the metal substrate having a surface texture configured to change an appearance of the coating layer or the multiple coating layers relative to an appearance of the coating layer or the multiple coating layers on an as-rolled surface finish of the metal substrate.

86. A method for assembling a self-retracting tape rule, the method comprising: forming an elongated tape rule blade configured for measurement, the elongated tape rule blade comprising a substrate and a coating layer or multiple coating layers, the substrate and the coating layer or multiple coating layers having different colors, the elongated tape rule blade having measurement indicia thereon, the forming comprising forming the measurement indicia as visible portions of the substrate, the visible portions being visible through localized gaps in the coating layer or the multiple coating layers; coupling a reel to the elongated tape rule blade, the reel configured to retract the elongated tape rule blade from an extended position to a wound position; providing a spring configured to apply a rotational bias to the reel that rotates the reel to retract the elongated tape rule blade into the wound position; providing a lock configured to selectively engage the elongated tape rule blade to maintain the elongated tape rule blade in the extended position; and housing the elongated tape rule blade, the reel, the spring, and the lock with a housing of the self-retracting tape rule blade.

87. The method of embodiment 86, further comprising forming the localized gaps in the coating layer or the multiple coating layers by locally removing material from the coating layer or the multiple coating layers.

88. The method of embodiment 86, further comprising forming the localized gaps in the coating layer or the multiple coating layers with uncoated portions of the substrate.

89. The method of embodiment 88, wherein the uncoated portions of the substrate are formed by preventing a coating from bonding to the substrate with resist material.

90. The method of embodiment 86, further comprising forming the localized gaps in the coating layer or the multiple coating layers with uncoated portions of a sub layer.

91. The method of embodiment 90, wherein the uncoated portions of a sub layer comprise areas where a coating was prevented from bonding to the sub layer by resist material.

92. The method of embodiment 86, wherein the coating layer or the multiple coating layers of the elongated tape rule blade comprise a non-polymer coating configured to provide one or more of color, environmental protection, and/or abrasion resistance to the elongated tape rule blade.

93. The method of embodiment 86, wherein the forming comprises metallurgically bonding reinforcements to the elongated tape rule blade at or near a free end of the elongated tape rule blade such that a cross sectional thickness of the elongated tape rule blade and the reinforcements is thicker than a cross sectional thickness of the elongated tape rule blade alone.

94. The method of embodiment 86, wherein the forming comprises imparting a surface texture to a metal substrate configured to change an appearance of the coating layer or the multiple coating layers relative to an appearance of the coating layer or the multiple coating layers on an as-rolled surface finish of the metal substrate.

Blade Graduation Marking—Voids Subset

95. A self-retracting tape rule, the tape rule comprising: an elongated tape rule blade configured for measurement, the elongated tape rule blade having measurement indicia thereon, the measurement indicia comprising surface voids in material of the elongated tape rule blade; a reel configured to retract the elongated tape rule blade from an extended position to a wound position; a spring configured to apply a rotational bias to the reel that rotates the reel to retract the elongated tape rule blade into the wound position; a lock configured to selectively engage the elongated tape rule blade to maintain the elongated tape rule blade in the extended position; and a housing configured to house the elongated tape rule blade, the reel, the spring, and the lock.

96. The tape rule of embodiment 95, wherein the surface voids are filled with a coating material having a contrasting color.

97. The tape rule of embodiment 96, wherein the material of the elongated tape rule blade comprises a coating layer on top of a substrate, the measurement indicia comprising voids in the substrate and/or the coating layer, the coating material having a contrasting color relative to the metal substrate and/or the coating layer.

98. The tape rule of embodiment 97, wherein the coating layer of the elongated tape rule blade comprises a non-polymer coating configured to provide one or more of color, environmental protection, and/or abrasion resistance to the elongated tape rule blade.

99. The tape rule of embodiment 97, wherein the coating layer of the elongated tape rule blade comprises a polymer coating configured to provide one or more of color, environmental protection, and/or abrasion resistance to the elongated tape rule blade.

100. The tape rule of embodiment 95, wherein the elongated tape rule blade comprises reinforcements metallurgically bonded to the elongated tape rule blade at or near a free end of the elongated tape rule blade such that a cross sectional thickness of the elongated tape rule blade and the reinforcements is thicker than a cross sectional thickness of the elongated tape rule blade alone.

101. The tape rule of embodiment 95, wherein the elongated tape rule blade comprises a metal substrate and a coating layer, the metal substrate having a surface texture configured to change an appearance of the coating layer relative to an appearance of the coating layer on an as-rolled surface finish of the metal substrate.

102. A method for assembling a self-retracting tape rule, the method comprising: forming an elongated tape rule blade configured for measurement, the elongated tape rule blade comprising a metal material, the elongated tape rule blade having measurement indicia thereon, the forming comprising including voids in the metal material to form the measurement indicia, the voids in the metal material filled with a coating material having a contrasting color; coupling a reel to the elongated tape rule blade, the reel configured to retract the elongated tape rule blade from an extended position to a wound position; providing a spring configured to apply a rotational bias to the reel that rotates the reel to retract the elongated tape rule blade into the wound position; providing a lock configured to selectively engage the elongated tape rule blade to maintain the elongated tape rule blade in the extended position; and housing the elongated tape rule blade, the reel, the spring, and the lock with a housing of the self-retracting tape rule.

103. The method of embodiment 102, wherein the metal material comprises a coating layer on top of a metal substrate, the measurement indicia formed by voids in the metal substrate and/or the coating layer, the coating material having a contrasting color relative to the metal substrate and/or the coating layer.

104. The method of embodiment 102, wherein the coating layer of the elongated tape rule blade comprises a non-polymer coating configured to provide one or more of color, environmental protection, and/or abrasion resistance to the elongated tape rule blade.

105. The method of embodiment 102, wherein the forming comprises metallurgically bonding metal reinforcements to the elongated tape rule blade at or near a free end of the elongated tape rule blade such that a cross sectional thickness of the elongated tape rule blade and the metal reinforcements is thicker than a cross sectional thickness of the elongated tape rule blade alone.

106. The method of embodiment 102, wherein the elongated tape rule blade comprises a metal substrate and a non-polymer coating layer, the forming comprising imparting a surface texture to the metal substrate configured to change an appearance of the coating layer relative to an appearance of the coating layer on an as-rolled surface finish of the metal substrate.

Base Material Preparation

107. A self-retracting tape rule, the tape rule comprising: an elongated tape rule blade configured for measurement, the elongated tape rule blade having measurement indicia thereon, the elongated tape rule blade comprising a substrate and a coating, the substrate having a surface texture configured to change an appearance of the coating relative to an appearance of the coating on an as processed surface finish of the metal substrate; a reel configured to retract the elongated tape rule blade from an extended position to a wound position; a spring configured to apply a rotational bias to the reel that rotates the reel to retract the elongated tape rule blade into the wound position; a lock configured to selectively engage the elongated tape rule blade to maintain the elongated tape rule blade in the extended position; and a housing configured to house the elongated tape rule blade, the reel, the spring, and the lock.

108. The tape rule of embodiment 107, wherein the substrate is metal.

109. The tape rule of embodiment 107, wherein the substrate is a polymer.

110. The tape rule of embodiment 107, wherein the changed appearance of the coating comprises gloss, matte, eggshell, satin, or flat.

111. The tape rule of embodiment 107, wherein the changed appearance of the coating is uniform in nature.

112. The tape rule of embodiment 107, wherein the changed appearance of the coating has a specific predetermined texture or pattern.

113. The tape rule of embodiment 107, wherein the changed appearance of the coating comprises patterns in specific intervals repeating along a length of the elongated tape rule blade.

114. The tape rule of embodiment 107, wherein the coating is configured to provide one or more of color, environmental protection, or abrasion resistance to the elongated tape rule blade.

115. The tape rule of embodiment 107, wherein the elongated tape rule blade comprises reinforcements metallurgically bonded to the elongated tape rule blade at or near a free end of the elongated tape rule blade such that a cross sectional thickness of the elongated tape rule blade and the reinforcements is thicker than a cross sectional thickness of the elongated tape rule blade alone.

116. The tape rule of embodiment 107, wherein the measurement indicia comprise locally heated portions of the substrate or the coating of the elongated tape rule blade that create color contrasts between the substrate and the coating.

117. The tape rule of embodiment 107, wherein the measurement indicia comprise visible portions of the substrate, the visible portions being visible through localized gaps in the coating.

118. The tape rule of embodiment 107, wherein the measurement indicia comprise voids in a material of the elongated tape rule blade.

119. The tape rule of embodiment 107, wherein the coating is a non-polymer coating.

120. The tape rule of embodiment 107, wherein the coating is metal.

121. The tape rule of embodiment 107, wherein the coating is ceramic.

122. A method for assembling a self-retracting tape rule, the method comprising: forming an elongated tape rule blade configured for measurement, the elongated tape rule blade having measurement indicia thereon, the elongated tape rule blade comprising a metal substrate and a non-polymer coating, the metal substrate having a surface texture configured to change an appearance of the coating relative to an appearance of the coating on an as-rolled surface finish of the metal substrate; coupling a reel to the elongated tape rule blade, the reel configured to retract the elongated tape rule blade from an extended position to a wound position; providing a spring configured to apply a rotational bias to the reel that rotates the reel to retract the elongated tape rule blade into the wound position; providing a lock configured to selectively engage the elongated tape rule blade to maintain the elongated tape rule blade in the extended position; and housing the elongated tape rule blade, the reel, the spring, and the lock with a housing of the self-retracting tape rule.

123. The method of embodiment 122, wherein the changed appearance of the coating comprises gloss, matte, eggshell, satin, or flat.

124. The method of embodiment 122, wherein the non-polymer coating is configured to provide one or more of color, environmental protection, or abrasion resistance to the elongated tape rule blade.

125. The method of embodiment 122, wherein the forming comprises metallurgically bonding metal reinforcements to the elongated tape rule blade at or near a free end of the elongated tape rule blade such that a cross sectional thickness of the elongated tape rule blade and the metal reinforcements is thicker than a cross sectional thickness of the elongated tape rule blade alone.

126. The method of embodiment 122, wherein the forming comprises locally annealing portions of the metal substrate or the coating of the elongated tape rule blade to create color contrasts between the metal substrate and the coating to form the measurement indicia.

127. The method of embodiment 122, wherein the forming comprises forming the measurement indicia as visible portions of the metal substrate, the visible portions being visible through localized gaps in the coating.

128. The method of embodiment 122, wherein the forming comprises forming the measurement indicia with voids in a metal material of the elongated tape rule blade filled with a coating material having a contrasting color.

Blade Graduation Marking—Picosecond Laser Subset

129. A self-retracting tape rule, the tape rule comprising: an elongated tape rule blade configured for measurement, the elongated tape rule blade having measurement indicia thereon, the elongated tape rule blade comprising a substrate and a non-polymer coating, the non-polymer coating configured to provide one or more of color, environmental protection, and/or abrasion resistance to the elongated tape rule blade; a reel configured to retract the elongated tape rule blade from an extended position to a wound position; a spring configured to apply a rotational bias to the reel that rotates the reel to retract the elongated tape rule blade into the wound position; a lock configured to selectively engage the elongated tape rule blade to maintain the elongated tape rule blade in the extended position; and a housing configured to house the elongate tape rule blade, the reel, the spring, and the lock.

130. The tape rule of embodiment 129, wherein the substrate is formed from metal.

131. The tape rule of embodiment 129, wherein the measurement indicia are formed in the substrate by impinging the substrate with pulsed radiation having an ultraviolet, visible, or infrared wavelength, a pulse width of less than 20 picoseconds, a power of less than 100 Watts, and a repetition rate up to 100 gigahertz.

132. The tape rule of embodiment 129, wherein the measurement indicia are formed in the substrate by impinging the substrate with radiation from a picosecond laser.

133. The tape rule of embodiment 129, wherein the measurement indicia comprise portions of the substrate with local nanostructured surface changes relative to other portions of the substrate, the local nanostructured surface changes configured to trap or absorb light to create color contrasts with the other portions of the substrate.

134. A self-retracting tape rule, the tape rule comprising: an elongated tape rule blade configured for measurement, the elongated tape rule blade having measurement indicia thereon, the elongated tape rule blade comprising a substrate, wherein the measurement indicia comprise portions of the substrate with local nanostructured surface changes relative to other portions of the substrate, the local nanostructured surface changes configured to trap or absorb light to create color contrasts with the other portions of the substrate; a reel configured to retract the elongated tape rule blade from an extended position to a wound position; a spring configured to apply a rotational bias to the reel that rotates the reel to retract the elongated tape rule blade into the wound position; a lock configured to selectively engage the elongated tape rule blade to maintain the elongated tape rule blade in the extended position; and a housing configured to house the elongate tape rule blade, the reel, the spring, and the lock.

135. A method of forming a self-retracting tape rule, the method comprising: providing a substrate for an elongated tape rule blade; forming measurement indicia on the substrate of the elongated tape rule blade such that the elongated tape rule blade is configured for measurement, wherein the measurement indicia comprise portions of the substrate with local nanostructured surface changes relative to other portions of the substrate, the local nanostructured surface changes configured to trap or absorb light to create color contrasts with the other portions of the substrate; coupling a reel to the elongated tape rule blade, the reel configured to retract the elongated tape rule blade from an extended position to a wound position; coupling a spring to the reel, the spring configured to apply a rotational bias to the reel that rotates the reel to retract the elongated tape rule blade into the wound position; and assembling the elongated tape rule blade, the reel, and the spring in a housing.

136. The method of embodiment 135, further comprising forming the measurement indicia in the substrate by impinging the substrate with radiation from a picosecond laser.

137. The method of embodiment 136, wherein the radiation from the picosecond laser has a pulse width of less than 20 picoseconds.

138. The method of embodiment 136, wherein the radiation from the picosecond laser has a power of less than 100 Watts.

139. The method of embodiment 136, wherein the radiation from the picosecond laser produces black colored measurement indicia in the substrate.

140. The method of embodiment 135, wherein the measurement indicia are formed on the substrate by impinging the substrate with pulsed radiation having an ultraviolet, visible, or infrared wavelength, a pulse width of less than 20 picoseconds, a power of less than 100 Watts, and a repetition rate up to 100 gigahertz.

141. The method of embodiment 140, wherein the pulsed radiation has an ultraviolet wavelength.

142. The method of embodiment 140, wherein the pulsed radiation has a pulse with of less than 10 picoseconds.

143. The method of embodiment 140, wherein the pulsed radiation has a power of less than 5 Watts.

144. The method of embodiment 140, wherein the repetition rate is up to 50 gigahertz.

145. The method of embodiment 135, wherein the measurement indicia are formed in the substrate with radiation from a picosecond laser substantially without photothermal effects on the substrate.

146. The method of embodiment 135, further comprising coating the substrate of the elongated tape rule blade with a non-polymer coating, the non-polymer coating configured to provide one or more of color, environmental protection, and/or abrasion resistance to the elongated tape rule blade.

147. A method of forming a self-retracting tape rule, the method comprising: providing a substrate for an elongated tape rule blade; forming measurement indicia on the substrate of the elongated tape rule blade such that the elongated tape rule blade is configured for measurement, wherein the measurement indicia are formed on the substrate by impinging the substrate with pulsed radiation having an ultraviolet, visible, or infrared wavelength, a pulse width of less than 20 picoseconds, a power of less than 100 Watts, and a repetition rate up to 100 gigahertz; coupling a reel to the elongated tape rule blade, the reel configured to retract the elongated tape rule blade from an extended position to a wound position; coupling a spring to the reel, the spring configured to apply a rotational bias to the reel that rotates the reel to retract the elongated tape rule blade into the wound position; and assembling the elongated tape rule blade, the reel, and the spring in a housing.

What is claimed is:

1. A self-retracting tape rule, the tape rule comprising:
   an elongated tape rule blade configured for measurement, the elongated tape rule blade having measurement indicia thereon, the elongated tape rule blade comprising a substrate, wherein the measurement indicia comprise portions of the substrate with local nanostructured changes relative to other portions of the substrate, wherein the local nanostructured changes are configured to trap or absorb light to create color contrasts with the other portions of the substrate, and wherein the local nanostructured changes comprise an annealed metallic structure or an oxidized metallic structure;
   a reel configured to retract the elongated tape rule blade from an extended position to a wound position;

a spring configured to apply a rotational bias to the reel that rotates the reel to retract the elongated tape rule blade into the wound position;

a lock configured to selectively engage the elongated tape rule blade to maintain the elongated tape rule blade in the extended position; and a housing configured to house the elongate tape rule blade, the reel, the spring, and the lock.

2. The tape rule of claim 1, wherein the substrate is formed from metal.

3. The tape rule of claim 1, wherein the elongated tape rule blade comprises a coating, and wherein the coating comprises an anodized portion of the substrate of the elongated tape rule blade.

4. The tape rule of claim 1, wherein the elongated tape rule blade comprises a coating, and wherein the coating comprises a ceramic physical vapor deposition (PVD) coating on the elongated tape rule blade.

5. The tape rule of claim 1, wherein the measurement indicia are formed in the substrate by impinging the substrate with pulsed radiation having an ultraviolet, visible, or infrared wavelength, a pulse width of less than 20 picoseconds, a power of less than 100 Watts, and a repetition rate up to 100 gigahertz.

6. The tape rule of claim 1, wherein the measurement indicia are formed in the substrate by impinging the substrate with radiation from a picosecond laser.

7. A method of forming a self-retracting tape rule, the method comprising:

providing a substrate for an elongated tape rule blade;

forming measurement indicia on the substrate of the elongated tape rule blade such that the elongated tape rule blade is configured for measurement, wherein the measurement indicia comprise portions of the substrate with local nanostructured changes relative to other portions of the substrate, wherein the local nanostructured changes are configured to trap or absorb light to create color contrasts with the other portions of the substrate, and wherein the local nanostructured changes comprise an annealed metallic structure or an oxidized metallic structure;

coupling a reel to the elongated tape rule blade, the reel configured to retract the elongated tape rule blade from an extended position to a wound position;

coupling a spring to the reel, the spring configured to apply a rotational bias to the reel that rotates the reel to retract the elongated tape rule blade into the wound position; and assembling the elongated tape rule blade, the reel, and the spring in a housing.

8. The method of claim 7, further comprising forming the measurement indicia in the substrate by impinging the substrate with radiation from a picosecond laser.

9. The method of claim 8, wherein the radiation from the picosecond laser has a pulse width of less than 20 picoseconds.

10. The method of claim 8, wherein the radiation from the picosecond laser has a power of less than 100 Watts.

11. The method of claim 8, wherein the radiation from the picosecond laser produces black colored measurement indicia in the substrate.

12. The method of claim 7, wherein the measurement indicia are formed on the substrate by impinging the substrate with pulsed radiation having an ultraviolet, visible, or infrared wavelength, a pulse width of less than 20 picoseconds, a power of less than 100 Watts, and a repetition rate up to 100 gigahertz.

13. The method of claim 12, wherein the pulsed radiation has an ultraviolet wavelength.

14. The method of claim 12, wherein the pulsed radiation has a pulse with of less than 10 picoseconds.

15. The method of claim 12, wherein the pulsed radiation has a power of less than 5 Watts.

16. The method of claim 12, wherein the repetition rate is up to 50 gigahertz.

17. The method of claim 7, wherein the measurement indicia are formed in the substrate with radiation from a picosecond laser substantially without photothermal effects on the substrate.

18. The method of claim 7, further comprising coating the substrate of the elongated tape rule blade with a non-polymer coating, the non-polymer coating configured to provide one or more of color, environmental protection, and/or abrasion resistance to the elongated tape rule blade.

19. A method of forming a self-retracting tape rule, the method comprising:

providing a substrate for an elongated tape rule blade;

forming measurement indicia on the substrate of the elongated tape rule blade such that the elongated tape rule blade is configured for measurement, wherein the measurement indicia are formed on the substrate by impinging the substrate with pulsed radiation having an ultraviolet, visible, or infrared wavelength, a pulse width of less than 20 picoseconds, a power of less than 100 Watts, and a repetition rate up to 100 gigahertz;

coupling a reel to the elongated tape rule blade, the reel configured to retract the elongated tape rule blade from an extended position to a wound position;

coupling a spring to the reel, the spring configured to apply a rotational bias to the reel that rotates the reel to retract the elongated tape rule blade into the wound position; and assembling the elongated tape rule blade, the reel, and the spring in a housing.

20. A self-retracting tape rule, the tape rule comprising:

an elongated tape rule blade configured for measurement, the elongated tape rule blade having measurement indicia thereon, the elongated tape rule blade comprising a substrate, wherein portions of the substrate comprise local nanostructured changes relative to other portions of the substrate, wherein the local nanostructured changes comprise an annealed metallic structure or an oxidized metallic structure;

a reel configured to retract the elongated tape rule blade from an extended position to a wound position;

a spring configured to apply a rotational bias to the reel that rotates the reel to retract the elongated tape rule blade into the wound position;

a lock configured to selectively engage the elongated tape rule blade to maintain the elongated tape rule blade in the extended position; and a housing configured to house the elongate tape rule blade, the reel, the spring, and the lock.

* * * * *